United States Patent
White et al.

(10) Patent No.: US 12,442,648 B2
(45) Date of Patent: Oct. 14, 2025

(54) SYSTEMS AND METHODS FOR OPTIMAL PATH DETERMINATION USING CONTRACTION HIERARCHIES WITH MULTI-LINK CONSTRAINTS

(71) Applicant: Verizon Patent and Licensing Inc., Basking Ridge, NJ (US)

(72) Inventors: Hayden Sean White, Kaiapoi (NZ); Nathan M. Robinson, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 375 days.

(21) Appl. No.: 17/583,387

(22) Filed: Jan. 25, 2022

(65) Prior Publication Data

US 2023/0236025 A1 Jul. 27, 2023

(51) Int. Cl.
*G01C 21/34* (2006.01)

(52) U.S. Cl.
CPC ..... *G01C 21/3453* (2013.01); *G01C 21/3446* (2013.01)

(58) Field of Classification Search
CPC .................. G01C 21/3453; G01C 21/3446
See application file for complete search history.

(56) References Cited

U.S. PATENT DOCUMENTS

| | | | | |
|---|---|---|---|---|
| 6,564,224 B1* | 5/2003 | Wu | ............. | G01C 21/387 |
| 6,826,472 B1* | 11/2004 | Kamei | ............. | G01C 21/3605 |
| | | | | 701/428 |
| 6,885,937 B1* | 4/2005 | Suranyi | ............. | G09B 29/106 |
| | | | | 701/532 |
| 2006/0116815 A1* | 6/2006 | Nomura | ............. | G01C 21/3484 |
| | | | | 701/417 |
| 2008/0221786 A1* | 9/2008 | Otsuki | ............. | G06F 16/29 |
| | | | | 707/999.005 |
| 2009/0234577 A1* | 9/2009 | Rinscheid | ............. | G01C 21/3415 |
| | | | | 701/533 |
| 2009/0259394 A1* | 10/2009 | Vu | ............. | G01C 21/3446 |
| | | | | 701/533 |
| 2011/0113155 A1* | 5/2011 | Kuznetsov | ............. | G01C 21/3446 |
| | | | | 709/241 |
| 2011/0251783 A1* | 10/2011 | Doi | ............. | G01C 21/3446 |
| | | | | 701/532 |

(Continued)

*Primary Examiner* — Scott A Browne
*Assistant Examiner* — Terry C Buse

(57) ABSTRACT

A system described herein may provide a technique for the generation of a node map using contraction hierarchy techniques in a manner that accounts for multi-link constraints. Multi-link constraints may include a sequence of two or more links through the node map, and paths that include such multi-link constraints may be associated with an additional cost based on such inclusion. Shortcut links that represent paths through nodes contracted out of the node map may be associated with portions of multi-link constraints. Paths through such shortcut links, where such paths include the remainder of the multi-link constraint, may be considered as including the multi-link constraint, and the cost of such paths may be calculated accordingly. The costs of links and/or paths, including paths that include multi-link constraints, may be used in determining a path from a source node to a target node of the node map.

20 Claims, 21 Drawing Sheets

(56) References Cited

U.S. PATENT DOCUMENTS

| | | | |
|---|---|---|---|
| 2015/0066270 A1* | 3/2015 | Ogawa | B60L 53/64 |
| | | | 701/400 |
| 2015/0356759 A1* | 12/2015 | Delling | G06T 11/206 |
| | | | 345/440 |
| 2017/0336219 A1* | 11/2017 | Di Lorenzo | G01C 21/3453 |
| 2018/0174445 A1* | 6/2018 | Rolf | G08G 1/0141 |
| 2020/0338450 A1* | 10/2020 | Parr | A63F 13/35 |
| 2022/0342423 A1* | 10/2022 | Kono | B65G 37/02 |

* cited by examiner

SYSTEMS AND METHODS FOR OPTIMAL PATH DETERMINATION USING CONTRACTION HIERARCHIES WITH MULTI-LINK CONSTRAINTS

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would be expended after the query is received.

DETAILED DESCRIPTION OF EXAMPLE EMBODIMENTS

Figure 1:
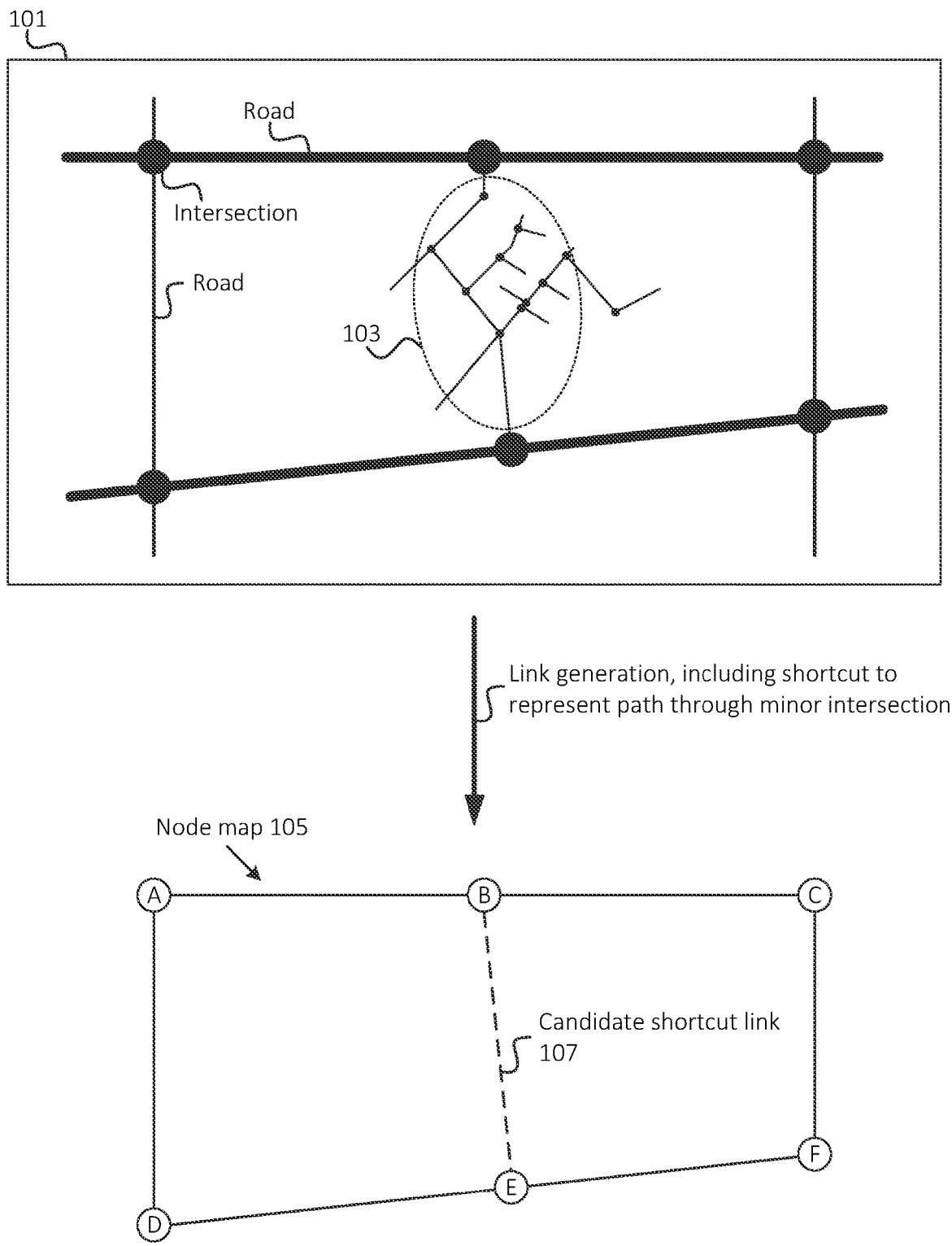
FIG. 1 illustrates an example generation of nodes and links, including a shortcut link that represents a path through multiple nodes, that are based on a set of physical roads and intersections.

The following detailed description refers to the accompanying drawings. The same reference numbers in different drawings may identify the same or similar elements.

Embodiments described herein provide for the identification of multi-link constraints on particular links or nodes in a node map, and the scoring of paths from a source node to a destination node based on the presence of such multi-link constraints. Such scoring of paths, based on multi-link constraints as described herein, may be used during a "pre-compute" operation, such as a contraction hierarchy technique in which nodes may be removed or "contracted" from the node map and potentially replaced by "shortcut" links, as described below. Additionally, or alternatively, the scoring of paths may be used during a "run-time" operation, such as when generating navigation instructions in response to a navigation request that specifies a starting point and a destination. For example, potential routes, paths, etc. that include multi-link constraints may be avoided when generating such navigation instructions, in order to prevent a situation in which a user would be provided navigation instructions with impracticable or impassable routes. As such, the user experience of users requesting navigation directions may be enhanced. Such navigation instructions, whether pre-computed or performed in real-time, may be provided to a fleet management system or may be performed by a fleet management system and provided to individual vehicles in the fleet for cost-based traversal of routes that may include multi-link constraints.

In some embodiments, as noted above, the node map may include "shortcut" links between some nodes, where a shortcut link represents multiple links between multiple nodes. The shortcut link may be added to the node map (e.g., may replace the component nodes and links in the node map, and/or may be added in addition to the component nodes and links), such that when the node map is used for a solution to a query (e.g., a shortest path solution, a lowest cost solution, a set of navigation instructions in response to a navigation request, or the like), the shortcut link may be used in lieu of computing a path through the component nodes and links of the shortcut link. As described herein, shortcut links may include portions of multi-link constraints, which may further be accounted for when determining path costs for paths that include such shortcut links. As such, embodiments described herein may properly account for multi-link constraints when determining an optimal (e.g., lowest cost) path from a source node to a destination node.

A "multi-link constraint," as discussed herein, may refer to a sequence of links that are, together, associated with a cost that is greater than the sum of the costs of the individual links. As applied to, for example, systems that utilize techniques described herein to generate navigation instructions (e.g., in response to a request from a starting destination to an ending destination), a multi-link constraint may refer to a prohibited maneuver in a complex intersection (e.g., a sequence of turns that are prohibited as indicated by traffic signage or road rules), a maneuver that is impossible to perform (e.g., crossing a physical barrier), a maneuver across a road obstacle (e.g., where such obstacle may be located in one lane or section of road), and/or some other reasoning that a particular sequence of links would be difficult, impossible, unsafe, or otherwise associated with a greater cost than a sum of the costs of the individual links. A "cost" of a link, as discussed herein, may represent time spent traversing the link, resources spent traversing the link (e.g., fuel in situations where the link represents a physical road, electricity in situations where the link represents a pipeline through which fluid is pumped, etc.), or other suitable metrics that may be reflected by a cost, score, or the like.

As shown in FIG. 1, map 101 may represent a set of roads and intersections between the roads. In this figure, the intersections are denoted by filled circles on map 101. Map 101 may also include a set of "minor" roads 103. For example, each road and/or intersection may be associated with a score or other measure of "importance," which may be based on factors such as road size, road length, amount of traffic traveling on the road, and/or other attributes.

Some embodiments may generate node map 105 based on map 101 (e.g., based on the roads and/or intersections depicted in map 101), which may include the generation of one or more links representing roads and nodes representing intersections. Further, node map 105 may include one or more shortcut links. In the example here, candidate shortcut link 107 may represent the set of minor roads 103 depicted in map 101. Candidate shortcut link 107 may be determined using contraction hierarchy techniques (e.g., in which minor roads 103 are determined to be candidates for contraction into a shortcut link). For example, candidate shortcut link 107 may be determined based on measures of importance of minor roads 103. Candidate shortcut link 107 may be a "candidate" shortcut link in that suitable techniques may be used to determine whether candidate shortcut link 107 should ultimately be included in node map 105 or omitted. For example, as discussed below, some embodiments may evaluate multi-link constraints associated with candidate shortcut link 107 and one or more other links or paths between links to determine whether potential situations may exist where candidate shortcut link 107 is included in an appropriate path for a potential query, and/or where candidate shortcut link 107 is not included in an appropriate path for other potential queries.

Figure 2:
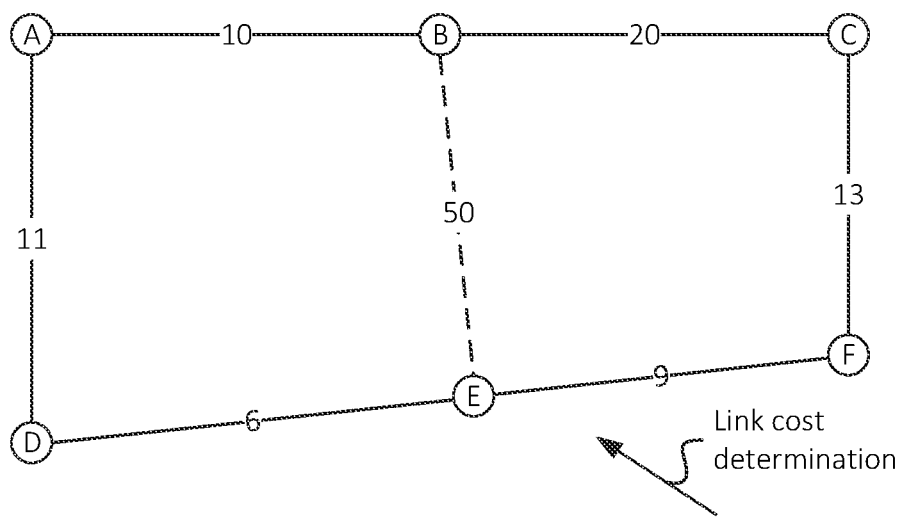
FIG. 2 illustrates example "costs" associated with the example links.

As noted above, as shown in FIG. 2, each link may be associated with a "cost," which may represent time spent traversing the link, resources spent traversing the link (e.g., fuel in situations where the link represents a physical road, electricity in situations where the link represents a pipeline through which fluid is pumped, etc.), or other suitable metrics that may be reflected by a cost, score, or the like. For example, as shown in FIG. 2, the cost of the link between Node A and Node B (referred to herein using the notation "Link(AB)") is 10, the cost of Link(BC) is 20, the cost of candidate shortcut link 107 (e.g., Link(BE)) is 50 and so on.

Figure 3:
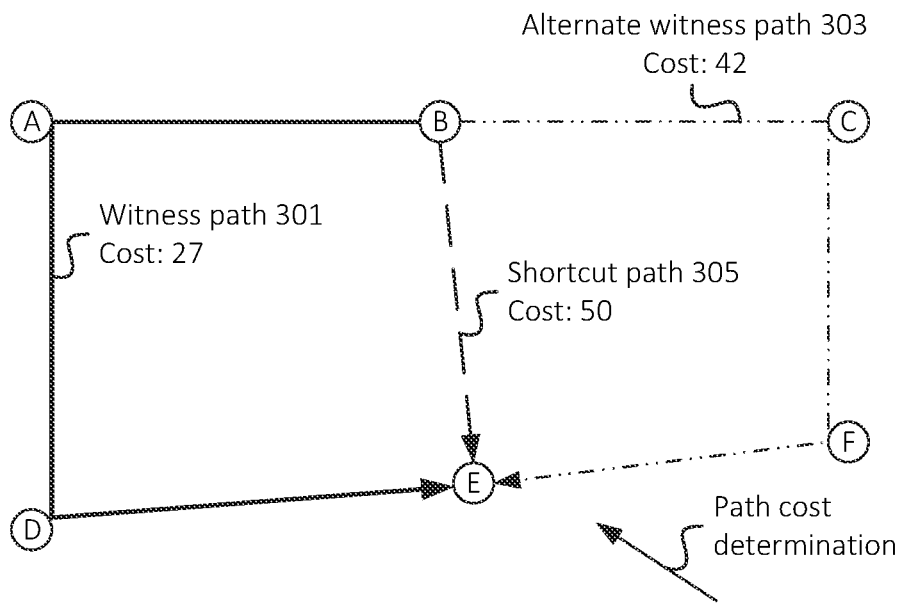
FIG. 3 illustrates an example identification of "witness" paths that serve as lower cost alternatives to a path through the shortcut link.

As shown in FIG. 3, contraction hierarchy techniques may include the determination of whether one or more "witness paths" exist for candidate shortcut link 107. For example, several candidate paths from Node B to Node E are determined. As referred to herein, a "path" includes a starting node, an ending node, and one or more links. One or more of the paths, referred to herein as a "shortcut paths," may include only candidate shortcut link 107. Further, one or more "witness paths" may be identified, where a witness path refers to a path through the node map that has the same starting node and ending node as a shortcut path (or candidate shortcut path), and that also has a lower cost than the shortcut path. In some embodiments, a witness path may not include a shortcut link. In the example of FIG. 3, the shortcut path includes only Link(BE)—that is, a path directly from Node B to Node E. In practice, similar concepts may apply when evaluating a path in the other direction along Link (BE), which may be a path directly from Node E to Node B.

In some embodiments, candidate shortcut links may be evaluated in a unidirectional manner. For example, in some embodiments, a candidate shortcut link may be added to the node map if the evaluation of the candidate shortcut link, as described herein, only indicates that the shortcut link applies in one direction (but not all directions). For the sake of brevity, only one direction (i.e., from Node B to Node E) is described herein.

In this example, witness path 301, which traverses Node B, Node A, Node D, and then Node E (referred to herein using the notation "Path(BADE)") may have a cost of 27. That is, Path(BADE) may have the sequence of component links Link(BA), Link(AD), and Link (DE). Referring to the example costs shown in FIG. 2, the respective link costs of these links are 10, 11, and 6, resulting in path cost of 27 for witness path 301 (10+11+6). In the examples herein, path costs are computed by adding link costs of component links. In practice, other techniques for computing paths costs may be used. For example, as discussed below, some paths may include multi-link constraints, which may increase the cost of a path further than the cumulative cost of the component links.

In the examples herein, path costs are described as being computed by adding link costs of component links. In practice, other techniques for computing paths costs may be used. Further, in this example, it is assumed that link costs apply in both directions. In practice, links may have different costs for different directions, and similar concepts may be applied when evaluating such links in different directions. For example, in some scenarios, Link(AB) may have a cost of 10 in one direction, and a cost of 15 in the other direction. In other words, Path(AB) may have an example path cost of 10, while Path(BA) may have an example path cost of 15. In such scenarios, a path cost may be computed by adding path costs of component paths. For example, the cost of Path (BADE) may be based in part on the path cost of Path(BA), but not based on the path cost of Path(AB).

Continuing with the example of FIG. 3, alternate witness path 303, which traverses Path(BCFE), may have a path cost of 42, and shortcut path 305 may have a path cost of 50 (e.g., the same cost as Link(BE) or of Path(BE), in situations where Path(BE) and Path(EB) have different costs). Thus, as witness path 301 and alternate witness path 303 each have a lower cost than shortcut path 305, witness path 301 and alternate witness path 303 may be considered as valid witness paths for shortcut path 305. That is, as similarly noted above, witness path 301 and alternate witness path 303 may each share the same start and end points with shortcut path 305, and may each be associated with a lower cost than shortcut path 305. Alternate witness path 303 may be an "alternate" witness path, in that the cost of alternate witness path 303 is lower than witness path 301. In some embodiments, only one witness path may be determined. For example, processing may continue to evaluating other candidate shortcut links once a witness path is found for shortcut path 305. In some embodiments, multiple witness paths may be attempted to be found for a given shortcut link.

Generally, a determination of at least one witness path for a shortcut link (e.g., for one or more shortcut paths that include the shortcut link, which may include different directions of traversing the same link) may indicate that the shortcut link should be omitted from the node map. For example, the determination of the witness path may indicate that the shortcut link is unlikely to ever be used for a query, as the witness path is by definition a lower cost than the shortcut link. However, as noted above, situations may arise in which constraints associated with a witness path may make the witness path untraversable for some queries, while being traversable for other queries.

For example, in embodiments where the node map corresponds to a system that provides navigation instructions from a starting point to a destination (e.g., a source node to a target node), a potential set of navigation instructions (e.g., a candidate path) may include a multi-link constraint, such as the traversal of a sequence of certain roads (e.g., represented by links) that is impossible, unsafe, or otherwise increases the cost of the path as discussed herein.

Figure 4:
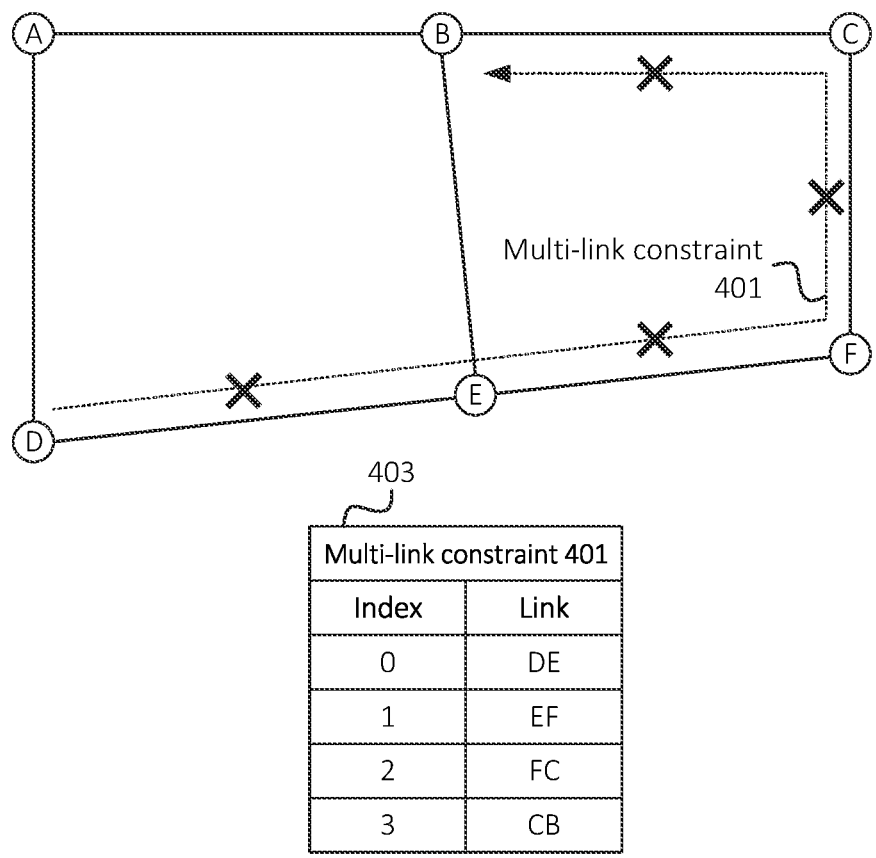
FIG. 4 illustrates an example of a multi-link constraint, in accordance with some embodiments.

For example, as shown in FIG. 4, multi-link constraint 401 may include the following sequence of links, as denoted by data structure 403: Link(DE), Link(EF), Link(FC), and Link (CB). Data structure 403 represents multi-link constraint 401 in terms of an index and a link. For example, the index of the first link (i.e., Link(DE)) of multi-link constraint 401 is 0, the index of the second link (i.e., Link(EF)) of multi-link constraint 401 is 1, and so on. Multi-link constraint 401 may also be represented as an example Path (DEFCB). A path that includes this particular sequence of links may be considered as "including" multi-link constraint 401.

Figure 5:
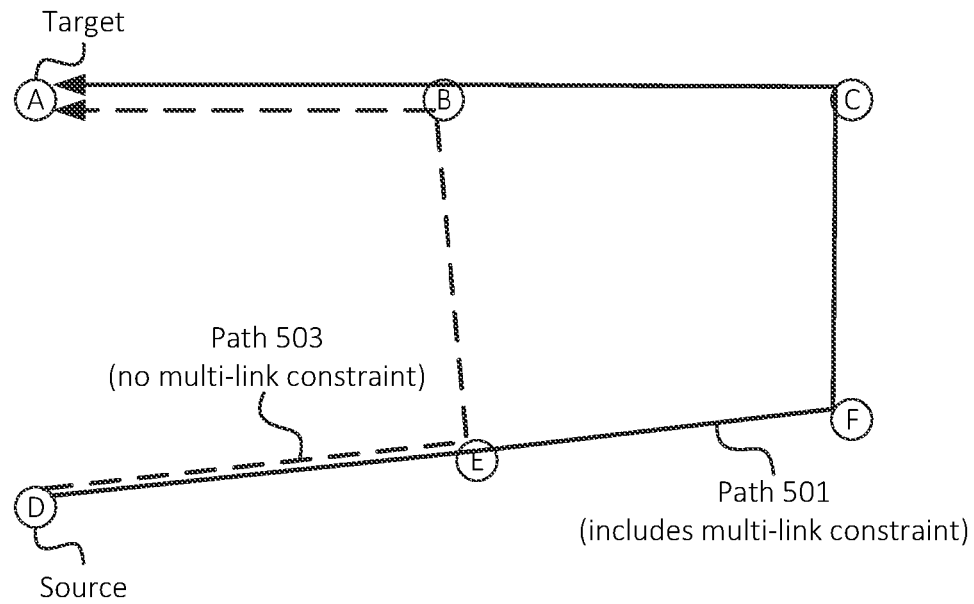
FIG. 5 illustrates an example of identifying candidate paths from a source node to a target node, where one candidate path is associated with a multi-link constraint and another candidate path is not associated with a multi-link constraint, in accordance with some embodiments.
Figure 5:
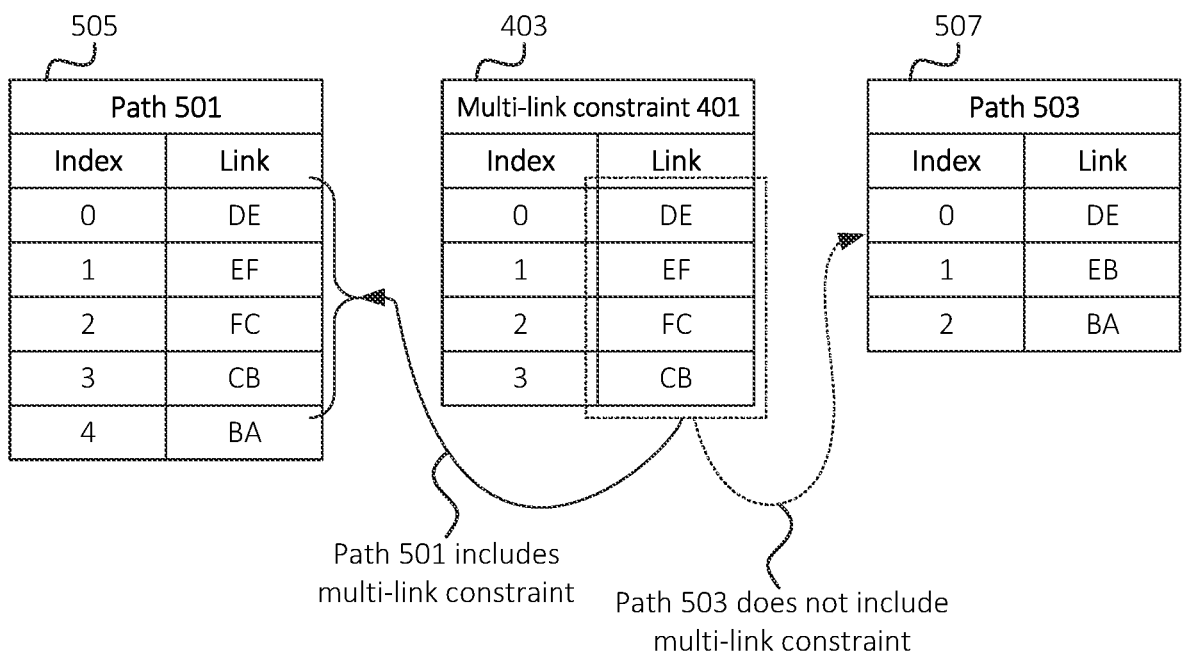

For example, as shown in FIG. 5, an example path 501 (e.g., Path(DEFCBA)) would be considered as including multi-link constraint 401, as Path(DEFCBA) includes multi-link constraint 401 (e.g., includes Path(DEFCB)). For example, data structure 505 represents path 501. Each link of path 501, as represented in data structure 505, may be compared to the first link of multi-link constraint 401, as represented in data structure 403, to determine whether multi-link constraint 401 has been started. In this example, the first link of multi-link constraint 401, represented by index 0 in data structure 403, may match a particular link of path 501 (e.g., index 0 in data structure 505). Once multi-link constraint 401 has been started, the next link in multi-link constraint 401 (i.e., index 1 in data structure 403) may be compared to the next link of path 501 (i.e., index 1 in data structure 505). This process may continue iteratively until the entire sequence of links of multi-link constraint 401 has been identified in data structure 505 (e.g., without any intervening links in path 501). Since data structure 505 includes the same links in the same sequence as data structure 403, path 501 may be considered as including multi-link constraint 401.

A similar process may be used to determine that path 503 does not include multi-link constraint 401. For example, the first link of multi-link constraint 401, represented by index 0 in data structure 403, may match a particular link of path 503 (e.g., index 0 in data structure 507). As multi-link constraint 401 has been started here, the next link in multi-link constraint 401 (i.e., index 1 in data structure 403) may be compared to the next link of path 503 (i.e., index 1 in data structure 507). In this example, the next link of path 503 (i.e., index 1 in data structure 507, or Link(EB)), may not match the next link of multi-link constraint 401 (i.e., index 1 in data structure 403, or Link(EF)). As such, the entire sequence of links of multi-link constraint 401 may not be found within path 503, and path 503 is therefore considered as not including multi-link constraint 401.

Figure 6:
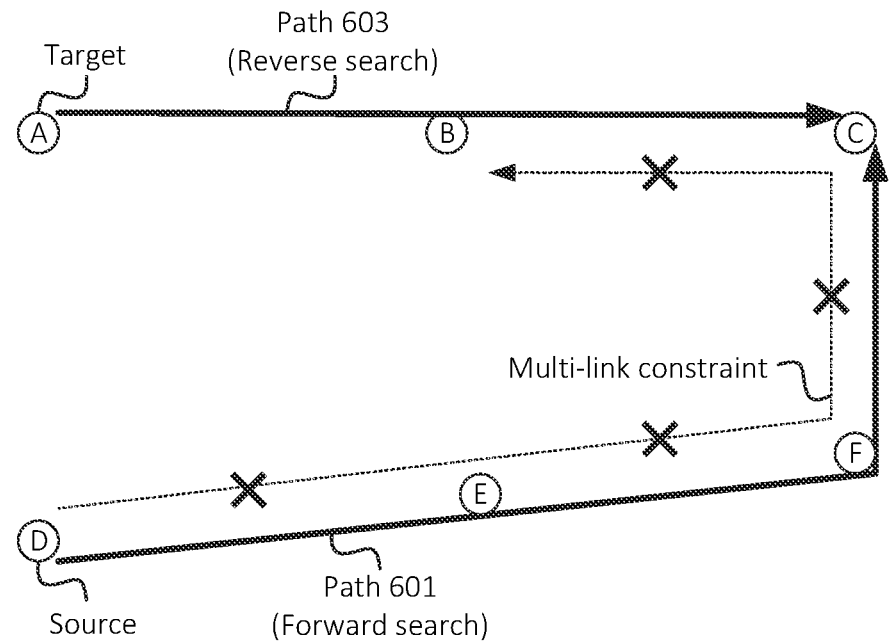
FIG. 6 illustrates an example of identifying a path from a source node to a target node, generated using a bidirectional search, that includes a multi-link constraint, in accordance with some embodiments.
Figure 6:
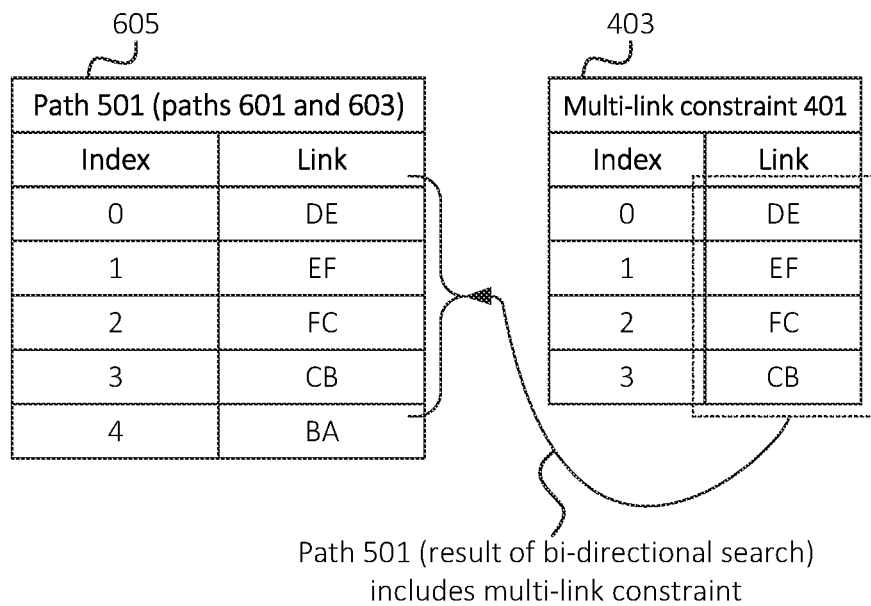

In some embodiments, a multi-link constraint may be identified as part of a bidirectional search, in which a path from a source to a target is determined by performing a forward search from the source and a reverse search from the target, until the two searches intersect at a particular node. For example, as shown in FIG. 6, a bidirectional search from Node D to Node A may include path 601, resulting from a forward search from Node D, and path 603, resulting from a reverse search from Node A. The resulting path of this bidirectional search may be the same path 501 discussed above (i.e., Path(DEFCBA)). As such, similar techniques described above may be used to identify that path 501, which may have been generated as the result of a bidirectional search, includes multi-link constraint 401.

Figure 7:
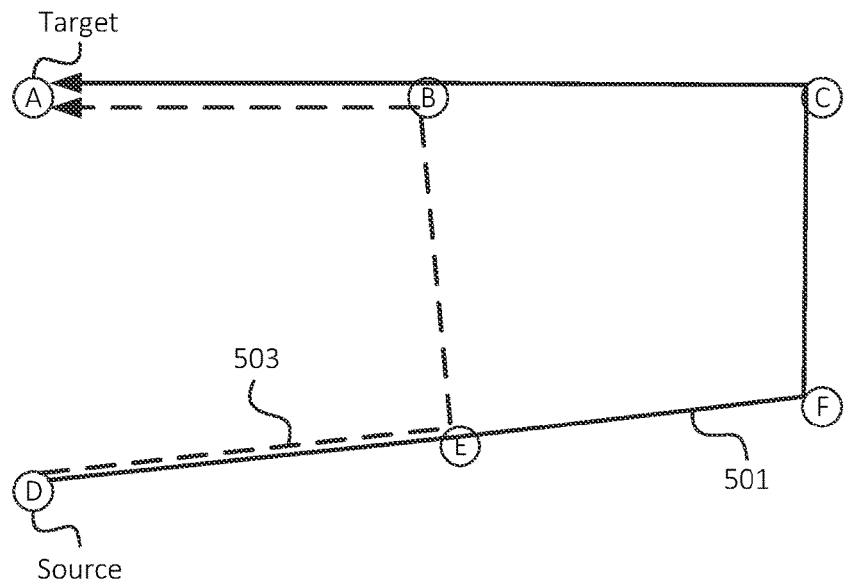
FIG. 7 illustrates an example of determining costs associated with candidate paths from a source node to a target node, where one candidate path is associated with a multi-link constraint and another candidate path is not associated with a multi-link constraint, in accordance with some embodiments.

As discussed above, the inclusion of a multi-link constraint in a path may increase the path cost, as compared to the cost of the path without considering the multi-link constraint. For example, As shown in FIG. 7, data structure 701 includes example link costs for links that may be included in paths 501 and 503. Such link costs may be reflected in data structures 703 and 705. For example, as shown, data structure 703 may include a cost for each link in path 501, as well as a cumulative or total cost that includes the cost of a link and the costs of all preceding links.

For example, data structure 703 may indicate that the link cost of the first link of path 501 (i.e., Link (DE), having index 0) is 10, and the total cost of path 501, as of the traversal of Link(DE), is also 10. Data structure 703 may further indicate that the link cost of the second link of path 501 (i.e., Link(EF), having index 1) is 10, and that the total cost of path 501, as of the traversal of Link(EF), is 20. Data structure 703 may further indicate that the link cost of the third link of path 501 (i.e., Link(FC), having index 2) is 8, and that the total cost of path 501, as of the traversal of Link(FC), is 28. Data structure 703 may further indicate that the link cost of the fourth link of path 501 (i.e., Link(CB), having index 3) is 7. Here, using techniques similarly described above, path 501 may be identified as including multi-link constraint 401 (i.e., Path(DEFC) and/or the sequence of links Link(DE), Link(EF), Link(FC), and Link (CB)). Based on the identification that multi-link constraint 401 is concluded within path 501, the total cost of path 501 may be denoted as including a multi-link constraint, denoted as a "P" in data structure 703. This notation may reflect that path 501 includes a multi-link constraint, and that the cost of path 501 is different (e.g., higher) than the cost of path 501 would have been if path 501 did not include a multi-link constraint. For example, the final cost of path 501, 39P, may indicate that the total cost of path 501 is 39 (e.g., based on the cost of individual links of path 501), and that path 501 includes a multi-link constraint.

In some embodiments, in addition to or in lieu of denoting the inclusion of a multi-link constraint in this manner, the cost may be modified in some other way. For example, a particular amount may be added to the cost of the path when a multi-link constraint is detected, the cost of the path may be multiplied by a particular amount, etc. For example, in such embodiments, the cost of path 501 may be 139 (e.g., adding 100 to 39), 78 (e.g., multiplying 39 by 2), or some other value that is different from 39 (e.g., where 39 is the sum of the costs of the links of path 501).

On the other hand, path 503, which does not include a multi-link constraint (e.g., does not include multi-link constraint 401), may be associated with a cost of 64, which may be computed by adding the costs of the individual links of path 503, as shown in data structure 705. As noted above, while examples herein provide costs of paths based on the sum of the costs of the links of the paths (and sometimes with an additional cost included based on the inclusion of a multi-link constraint), path costs may be computed in some other manner other than adding the costs of the links of the paths.

Figure 8:
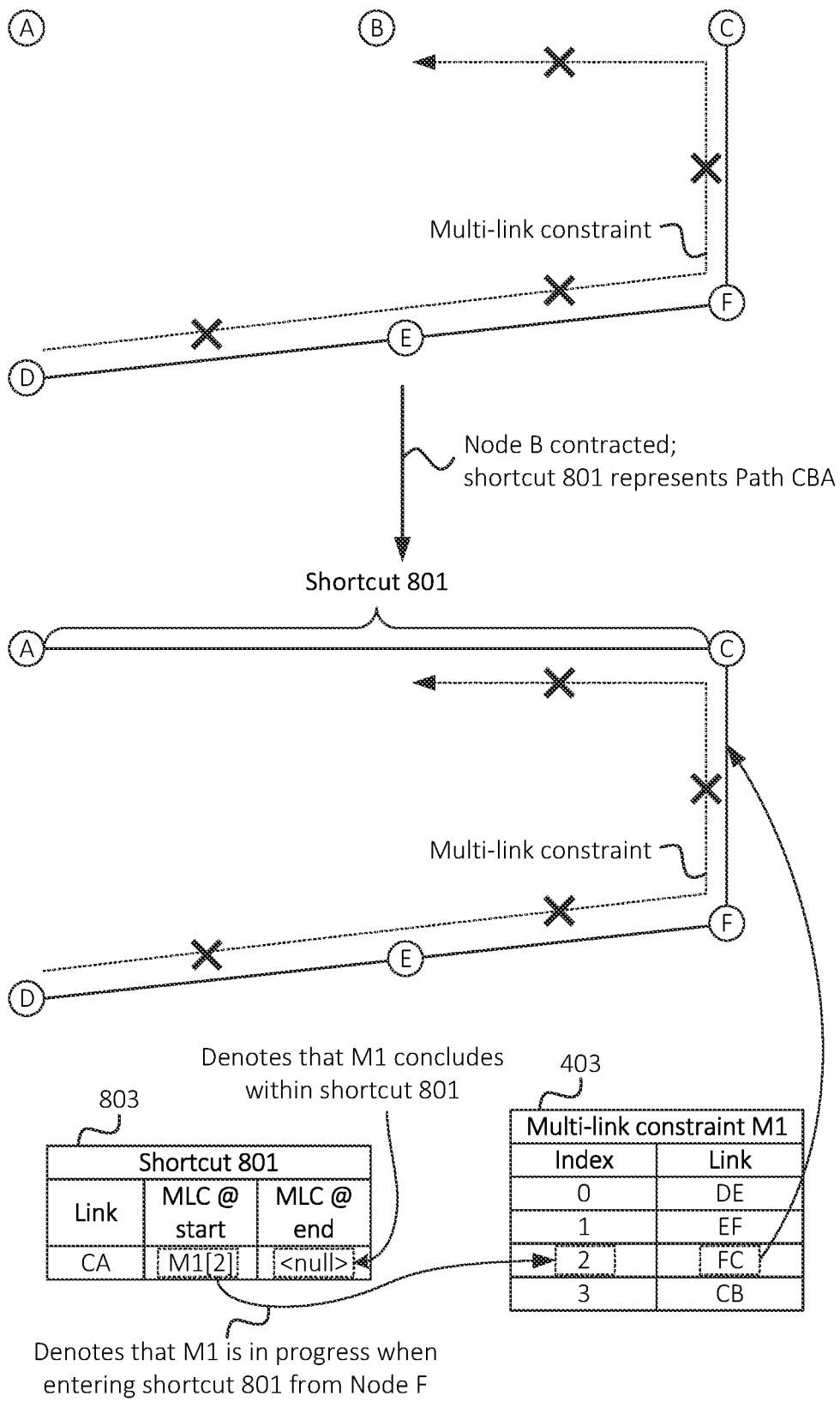
FIG. 8 illustrates an example of identifying a multi-link constraint that ends within a shortcut link, in accordance with some embodiments.

As discussed above, contraction hierarchy techniques may be used to remove nodes from a node map, where such removal includes generating a shortcut link to represent a path through such nodes. In some situations, a link that is associated with a multi-link constraint may be included in a shortcut link. As shown in FIG. 8, for example, Node B may be contracted, and the resulting shortcut link 801 may represent a path through Node B (e.g., Path(CBA)). In accordance with some embodiments, data structure 803 may be generated to reflect that traversing shortcut link 801 while multi-link constraint 401 (also referred to in the figures as "M1") is in progress will also lead to the completion of multi-link constraint 401.

For example, data structure 803 may include a record for "MLC at start" and a record for "MLC at end." The "MLC at start" record may indicate a particular index of a multi-link constraint that is in progress when shortcut link 801 is entered from a given node, and the "MLC at end" record may indicate a particular index of a multi-link constraint that is in progress when shortcut link 801 is exited to a given node. In this example, the "MLC at start" record includes a value of "M1[2]," denoting that if multi-link constraint 401 (e.g., M1) is in progress (e.g., at index 2) when shortcut link 801 is entered, then at least a subsequent portion of multi-link constraint 401 is further included in shortcut link 801. In this example, the "<null>" value for the "MLC at end" record of data structure 803 indicates that no multi-link constraint is in progress when shortcut link 801 is exited. Thus, if shortcut link 801 is entered while M1 is progress, then M1 is completed while shortcut link 801 is traversed.

Figure 9:
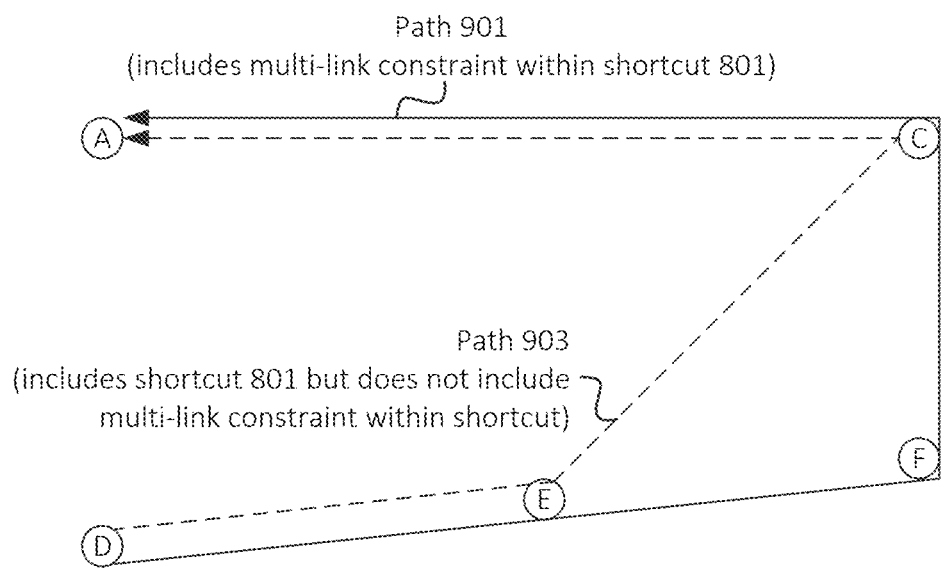
FIGS. 9-11 illustrate examples of determining path costs for multiple paths that include a shortcut link that is associated with a multi-link constraint, in accordance with some embodiments.
Figure 10:
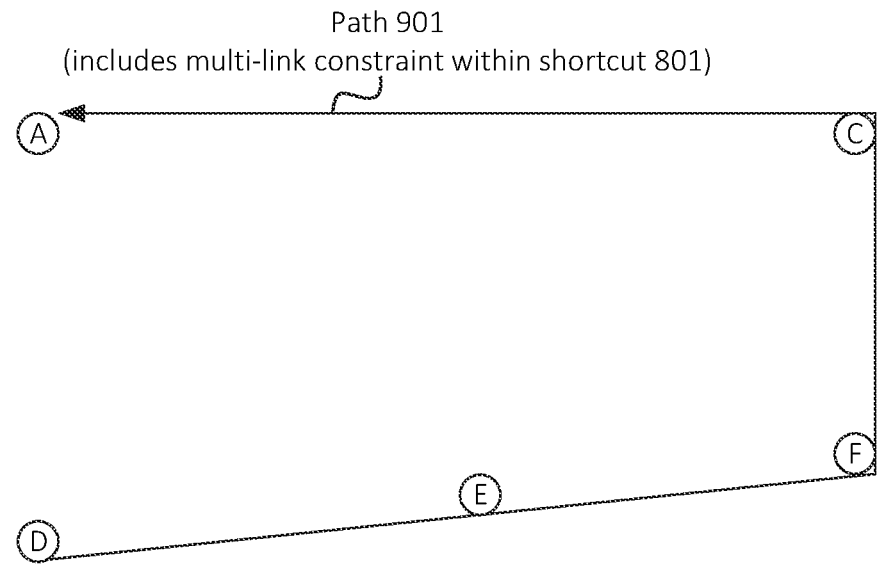
Figure 11:
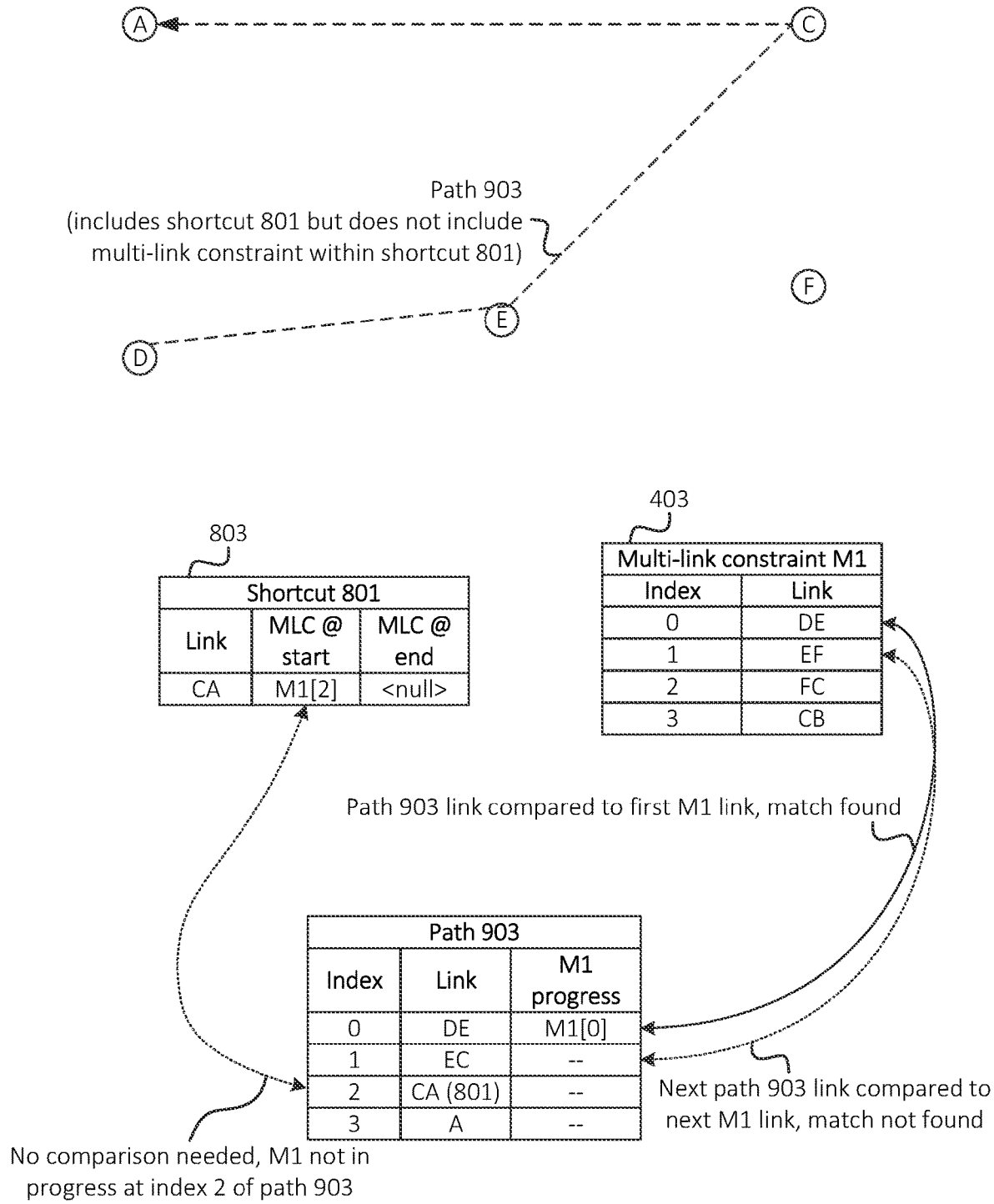

FIGS. 9-11 illustrate an example of the above discussion. As shown in FIG. 9, example paths 901 and 903 both include shortcut link 801 (i.e., Link(CA)). Although paths 901 and paths 903 both include shortcut link 801, which is potentially associated with multi-link constraint 401 (e.g., M1), as discussed above, path 901 is determined as including multi-link constraint 401 while path 903 is determined as not including multi-link constraint 401.

FIG. 10 illustrates an example of determining that path 901 includes multi-link constraint 401. For example, as similarly discussed above, each successive link of path 901 may be compared (at 1002) to the sequence of links in multi-link constraint 401 (e.g., M1) to determine that multi-link constraint 401 has been entered and/or is in progress.

For example, at index 0 of path 901 (e.g., Link(DE)), multi-link constraint 401 may be entered, as this link of path 901 matches the first link of multi-link constraint 401 (e.g., index 0 of data structure 403). At index 1 of path 901 (e.g., Link(EF)), multi-link constraint 401 may be considered as "in progress," as multi-link constraint 401 was in progress (e.g., was entered) at the previous index of path 901 and further because this link of path 901 matches the next link of multi-link constraint 401 (e.g., index 1 of data structure 403). Similarly, at index 2 of path 901, multi-link constraint 401 may still be considered as in progress. At index 3 of path 901, since Link(CA) is a shortcut link (i.e., shortcut link 801), data structure 803 associated with shortcut link 801 may be referred to (at 1002), in order to determine whether multi-link constraint 401 is continued via path 901.

Here, the "MLC at start" record of data structure 803 may be compared (at 1006) to the previous link of multi-link constraint 401 to determine whether multi-link constraint 401 is continued when shortcut link 801 is entered via path 901. For example, the "M1 progress" record of the previous link of path 901, when shortcut link 801 is entered via path 901, is M1[2], referring to Link(FC), as indicated in data structure 403. As such, it may be determined that shortcut link 801 is entered via path 901 when multi-link constraint 401 (e.g., M1) is in progress. As further discussed above, since multi-link constraint 401 concludes within shortcut link 801, multi-link constraint 401 may be considered as "complete" when shortcut link 801 is included in path 901.

On the other hand, as shown in FIG. 11, path 903 may be determined as not including multi-link constraint 401. For example, each successive link of path 903 may be compared to the sequence of links in multi-link constraint 401 (e.g., M1) to determine that multi-link constraint 401 has been entered and/or is in progress. For example, at index 0 of path 903 (e.g., Link(DE)), multi-link constraint 401 may be entered, as this link of path 903 matches the first link of multi-link constraint 401 (e.g., index 0 of data structure 403). The next link of path 903, Link(EC), may be compared to the next link of multi-link constraint 401 and may be determined as not matching the next link of multi-link constraint 401 (i.e., Link(EF)). As such, although multi-link constraint 401 was entered at the first link of path 903, the second link of path 903 did not continue the progress of multi-link constraint 401, and path 903 therefore does not include multi-link constraint 401. That is, although paths 901 and 903 both include shortcut link 801 (e.g., which is potentially associated with multi-link constraint 401, as discussed above), multi-link constraint 401 is not included in path 903, as shortcut link 801 is not entered via path 903 while multi-link constraint 401 is in progress.

Figure 12:
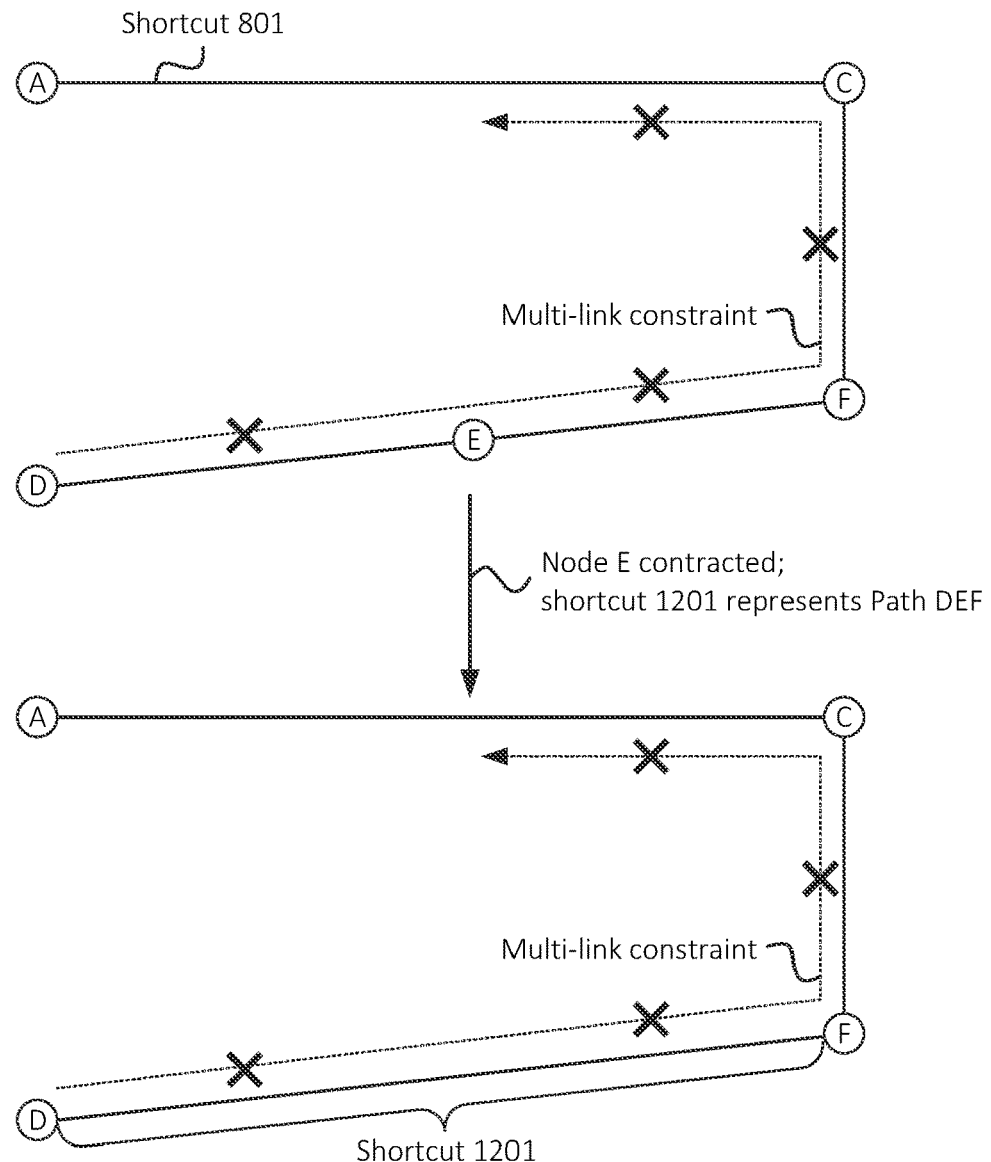
FIG. 12 illustrates an example of identifying a multi-link constraint that starts within a shortcut link, in accordance with some embodiments.
Figure 12:
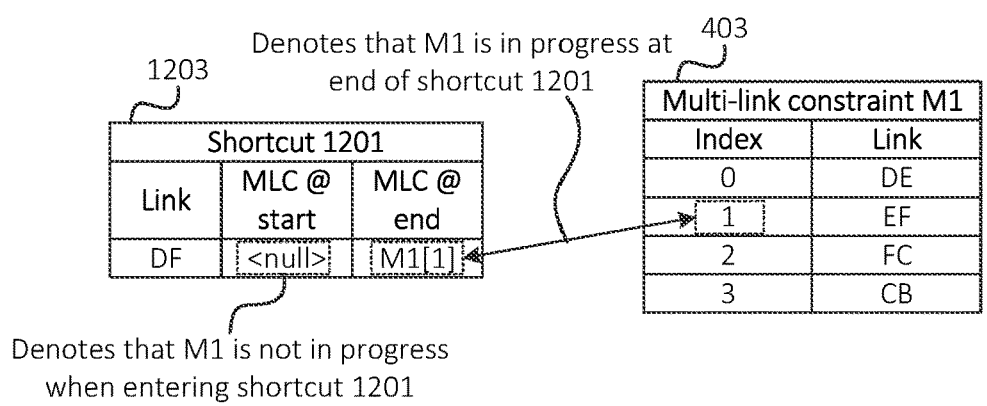

As shown in FIG. 12, contraction hierarchy techniques may be used to remove nodes from the node map, where such removal includes utilizing shortcut links to represent the removed nodes. In accordance with embodiments herein, the presence of multi-link constraints within such shortcut links may be recorded and used in identifying path costs associated with paths that include such shortcut links. As shown, for example, Node E may be contracted, such that shortcut link 1201 represents Path(DEF), which is a path Node D to Node F through Node E. In this example, shortcut link 1201 may end while multi-link constraint 401 is in progress.

Data structure 1203, associated with shortcut link 1201, may include "MLC at start" and "MLC at end" records, as similarly discussed above. The "MLC at start" record of data structure 1203 may indicate that no multi-link constraint is in progress when shortcut link 1201 is entered. In other words, there are no constraints, associated with multi-link constraint 401, relating to links prior to shortcut link 1201. For example, while Link(DE) is included as the first link of multi-link constraint 401 and also as the first link of shortcut link 1201, no other links are present in the sequence of multi-link constraint 401 (e.g., as shown in data structure 403) in order for multi-link constraint 401 to be entered. As such, entering shortcut link 1201 may necessarily mean entering multi-link constraint 401.

As further shown, the "MLC at end" record of data structure 1203 may indicate that multi-link constraint 401 (e.g., M1) is in progress when shortcut link 1201 is exited. That is, when Node E is contracted, data structure 403 may be checked for the link or links that are being incorporated into shortcut link 1201, which represents a path through Node E. For example, Link(EF), which is contracted into shortcut link 1201, is present in data structure 403 associated with multi-link constraint 401. Further, Link(EF) has the same ending node (i.e., Node F) as newly generated shortcut link 1201. As such, it may be determined that the "MLC at end" record for data structure 1203 is mapped to the particular link of multi-link constraint 401 (i.e., Link(EF), or index 1 in data structure 403) that matches the ending link that was contracted when generating shortcut link 1201.

Figure 13:
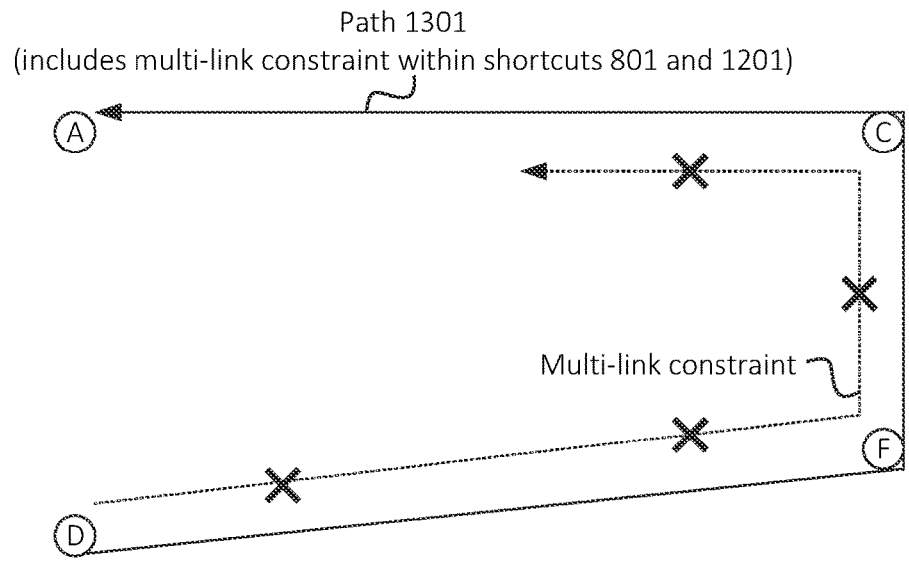
FIG. 13 illustrates an example of determining a path cost for a path that includes a multi-link constraint that starts within a shortcut link, in accordance with some embodiments.
Figure 13:
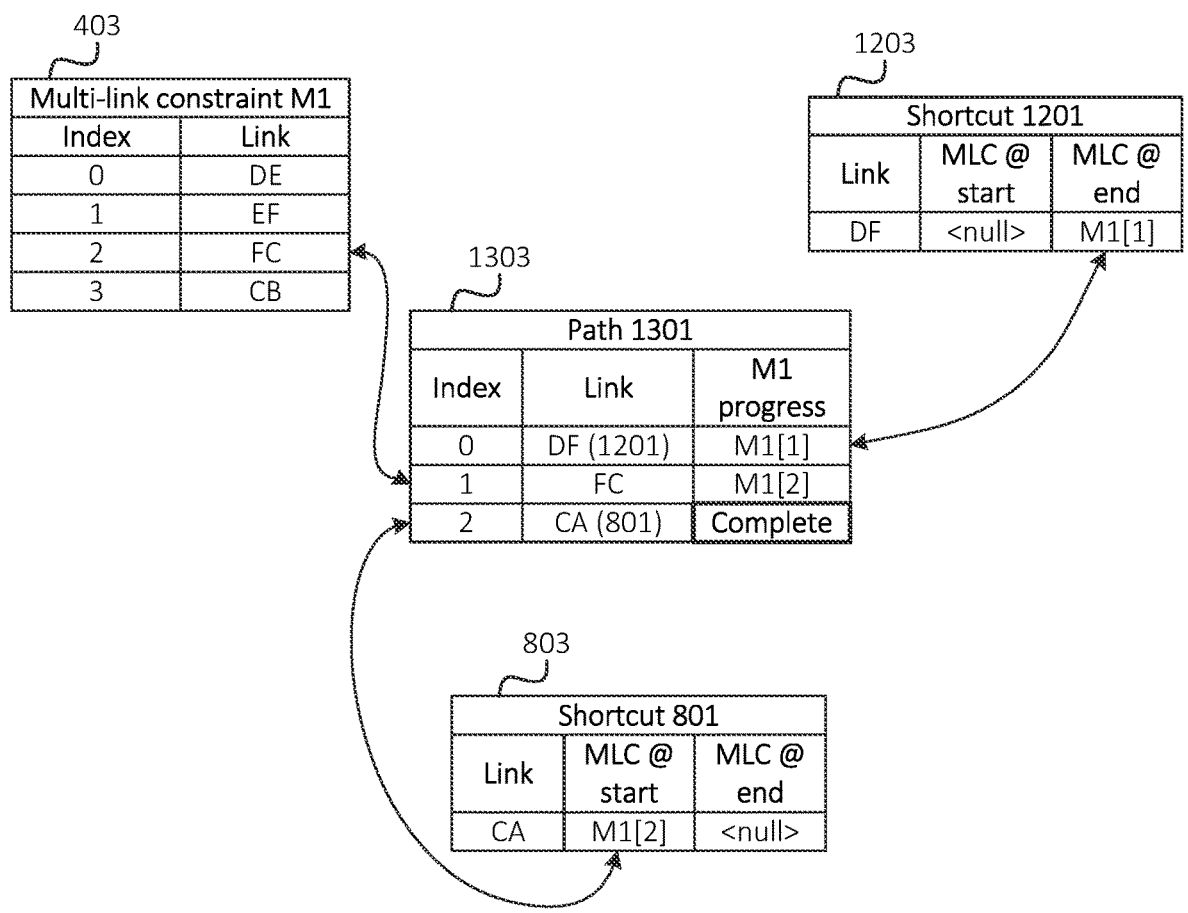

FIG. 13 illustrates an example of identifying that a particular path 1301 includes the example shortcut links 801 and 1201 discussed above. As reflected in data structure 1303, path 1301 may include Link(DF), Link(FC), and Link(CA). In other words, path 1301 may be referred to as Path(DFCA). As noted above, Link(DF) and Link(CA) may be shortcut links (i.e., shortcut links 1201 and 801, respectively). In this example, path 1301 may be analyzed to determine whether multi-link constraint 401 (e.g., represented by data structure 403) is included in path 1301.

Accordingly, the first link of path 1301 (e.g., index 0 of data structure 1303) may be identified. In this example, the first link of path 1301 is shortcut link 1201. As such, data structure 1203, associated with shortcut link 1201, may be identified. Data structure 1203 indicates no "MLC at start," and further indicates an "MLC at end." As such, it may be determined that traversing the first link of path 1301 results in a multi-link constraint being in progress, as data structure 1203 indicates that a multi-link constraint is in progress when shortcut link 1201 is exited. Specifically, for instance, data structure 1203 indicates that multi-link constraint 401 (e.g., M1) is in progress at index 1 (denoted in the figure as "M1 [1]") when shortcut link 1201 is traversed. As such, data structure 1303 may reflect that the traversal of the first link of path 1301, Link(DF) or shortcut link 1201, results in multi-link constraint 401 being in progress with index 1 of data structure 403 (e.g., Link(EF)) having been traversed.

The next link of path 1301 (e.g., index 1 of data structure 1303) may be identified. In this example, the second link of path 1301 is Link(FC). As similarly discussed above, this link of path 1301 may be analyzed to determine whether this link of path 1301 matches a "next" link associated with multi-link constraint 401. The "next" link of multi-link constraint 401 in this instance may be M1[2], as the previous link of path 1301 was associated with M1[1], as indicated in the "M1 progress" record of data structure 1303. Here, the second link of path 1301 matches the identified index of multi-link constraint 401 (i.e., M1[2] in data structure 403). As such, data structure 1303 reflects that multi-link constraint 401 is in progress at index 2 when Link(FC) is traversed via path 11301.

The next link of path 1301 (e.g., index 2 of data structure 1303) may be identified. In this example, the third link of path 1301 is shortcut link 801. As such, data structure 803, associated with shortcut link 801, may be identified. Data structure 803 indicates an "MLC at start," and further indicates no "MLC at end." As such, it may be determined that traversing the last link of path 1301 results in a multi-link constraint being completed if the "MLC at start" is satisfied. Here, the "MLC at start" of shortcut link 801 may be considered as "satisfied," as the "MLC at start" (i.e., M1[2]) matches the "M1 progress" record of the previous link of path 1301. That is, path 1301 enters Link(CA) while multi-link constraint 401 is in progress at index 2 (i.e., M1[2]). Since multi-link constraint 401 is in progress at index 2 when Link(CA) is entered via path 1301, and since Link(CA) is further associated with M1[2] as its "MLC at start" record (e.g., in data structure 803), then progress of multi-link constraint 401 may be considered as continuing when Link(CA) is entered via path 1301. Further, as discussed above, since the "MLC at end" record of data structure 803 is "<null>," this may indicate that multi-link constraint 401 concludes within shortcut link 801. As such, since multi-link constraint 401 is in progress when Link (CA) is entered via path 1301, and further since multi-link constraint 401 concludes within Link(CA), multi-link constraint 401 concludes within path 1301. Thus, since multi-link constraint 401 starts within path 1301 (e.g., at Link (DF)) and concludes within path 1301 (e.g., at Link(CA)), then path 1301 includes multi-link constraint 401.

Figure 14:
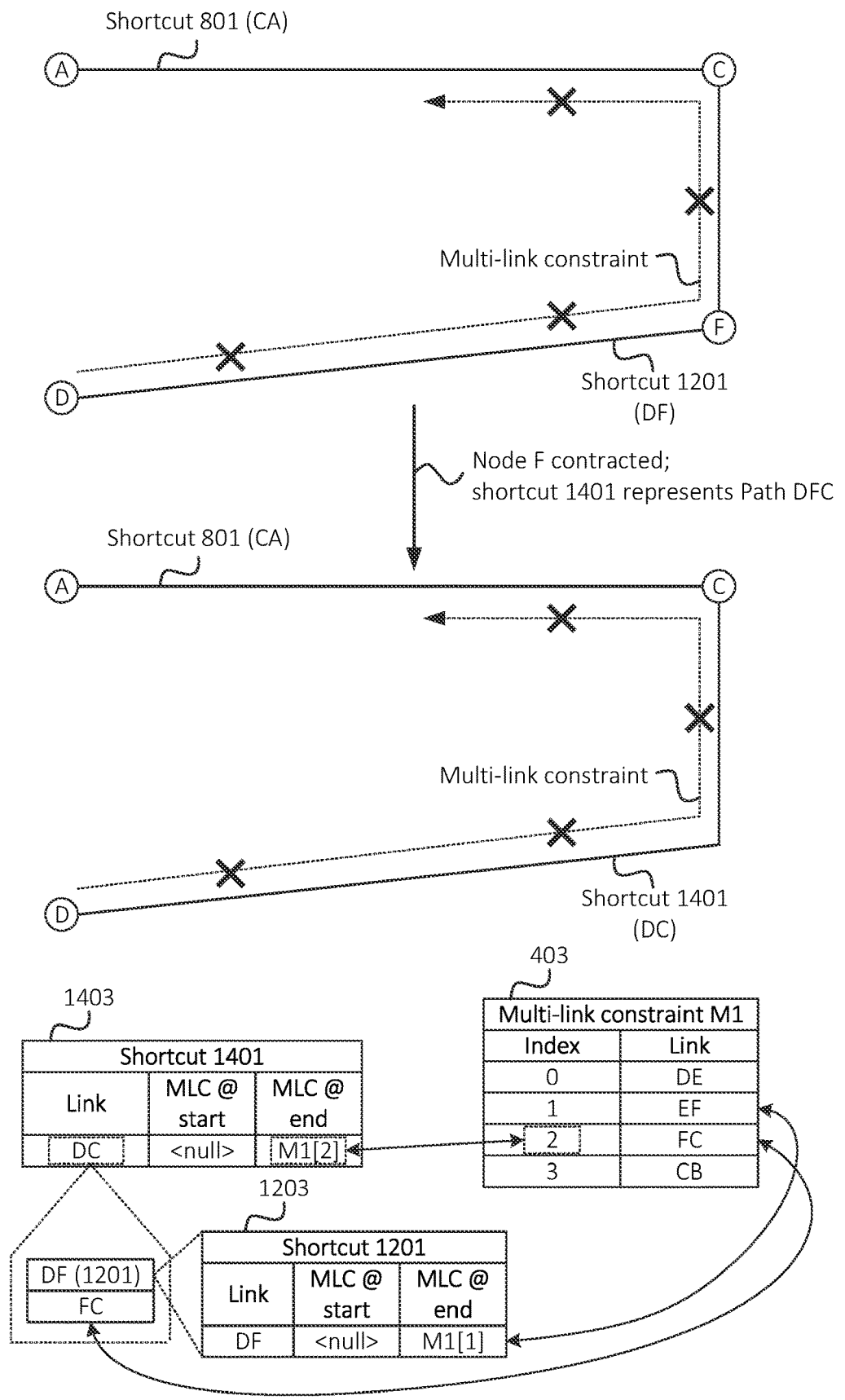
FIGS. 14 and 15 illustrate an example of identifying shortcut links that are included entirely within a multi-link constraint, in accordance with some embodiments.

In FIG. 14, Node F is contracted, and shortcut link 1401 represents Path(DFC), through contracted Node F. That is, referring to the examples above, shortcut link 1401 may include previously generated shortcut link 1201 (i.e., Link (DF)). As similarly discussed above, data structure 1403 may reflect multi-link constraints that are in progress at the start or end of shortcut link 1401. Here, as similarly discussed above, the "MLC at start" for shortcut link 1401 may be "<null>," as multi-link constraint 401 may not include any links that precede Node D. As further shown, the "MLC at end" for shortcut link 1401 may be M1[2]. For example, it may be determined that new shortcut Link(DC) represents shortcut link 1201 (i.e., Link(DF)) and Link(FC). As discussed above, shortcut link 1201 itself includes the beginning of multi-link constraint 401 and ends at M1[1] of data structure 403. The next contracted portion of Link(DC), which is Link(FC), is the next index (i.e., index 2) of data structure 403. As such, since shortcut link 1401 includes a first link (i.e., Link(DF)) in which multi-link constraint 401 starts, and further includes a second link (i.e., Link(FC)) in which multi-link constraint 401 continues, data structure 1403 may reflect that multi-link constraint 401 starts within shortcut link 1401, and further that the progress of multi-link constraint 401 is a completion of index 2 (i.e., M1[2]) when shortcut link 1401 is traversed via shortcut link 1401.

Figure 15:
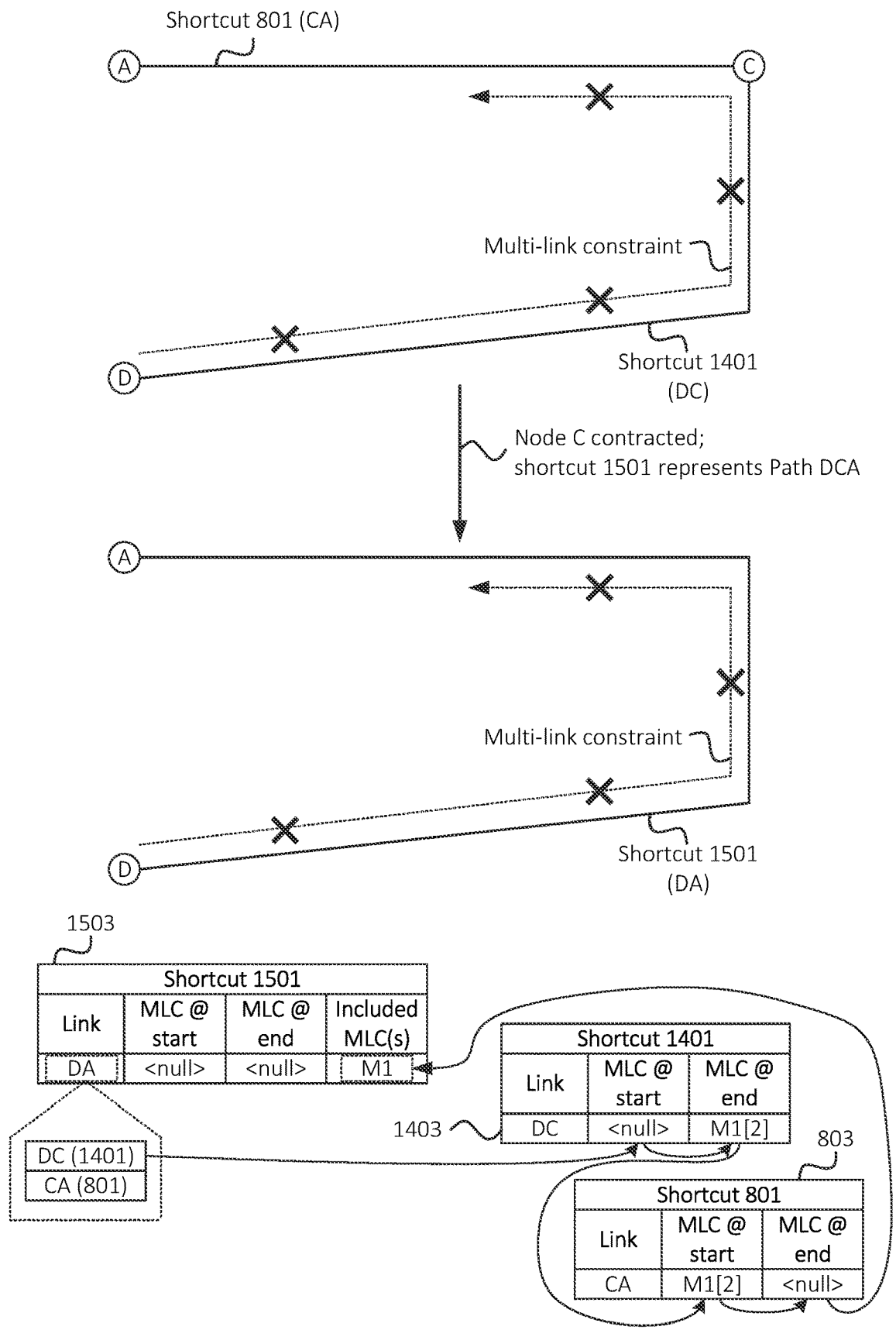

FIG. 15 illustrates a further contraction of the nodes of the node map discussed above. In this figure, Node C is contracted, and shortcut link 1501 accordingly represents Path (DCA). That is, new shortcut Link(DA) represents Path (DCA). As reflected in data structure 1503, shortcut link 1501 (e.g., new shortcut Link(DA)) is comprised of previous Link(DC) and previous Link(CA). As similarly discussed above, Link(DC) may itself be shortcut link 1401, and Link(CA) may be shortcut link 801. As such, data structures 1403 and 803, associated with shortcut links 1401 and 801, respectively, may be used to identify the multi-link constraints associated with shortcut link 1501.

For example, since shortcut link 1401, which is the first portion of shortcut link 1501, does not have a multi-link constraint in progress at the start (e.g., as reflected in data structure 403 associated with shortcut link 1401), then data structure 1503 may reflect that shortcut link 1501 also does not have a multi-link constraint in progress at the start of shortcut link 1501. The multi-link constraint in progress at the end of shortcut link 1401 (i.e., M1[2] in this example) may be compared to the multi-link constraint in progress at the start of the next portion of shortcut link 1501, in order to determine whether this next portion continues the multi-link constraint in progress at the end of the first portion of shortcut link 1501. Here, the next portion of shortcut link 1501 is Link(CA), associated with data structure 803. Data structure 803 indicates that the multi-link constraint in progress at the start of shortcut link 801 (e.g., Link(CA)) is M1[2], which matches the multi-link constraint in progress at the end of shortcut link 1401. As such, multi-link constraint 401 is in progress as shortcut link 801 is entered. Further, as noted above, multi-link constraint 401 ends within shortcut link 801, as reflected in the "<null>" value for the "MLC at end" record of data structure 803. Accordingly, the entirety of multi-link constraint 401 (e.g., M1) is included within shortcut link 1501, and data structure 1503 may indicate that M1 is an included multi-link constraint associated with shortcut link 1501. Thus, cost associated with shortcut link 1501 (e.g., a link cost of a link that includes shortcut link 1501 and/or a path cost of a path that includes shortcut link 1501) may be increased by an amount based on the inclusion of multi-link constraint 401 in shortcut link 1501, and/or may be annotated (e.g., with a "P," as similarly discussed above) to indicate that shortcut link 1501 includes a multi-link constraint.

As noted above, a shortcut link may be created to represent a path via a node that is contracted from a node map, such as a node that is contracted (e.g., using one or more contraction hierarchy techniques) based on importance of the node or other suitable factors. A valid witness path may have the same starting and ending nodes as a candidate shortcut link, but may be associated with a lower cost. An example of an invalid witness path may be a path that has the same starting and ending nodes as the candidate shortcut link, but is associated with a higher cost. Such higher cost may be due to higher costs associated with the links of which the candidate shortcut link is comprised, the inclusion of a partial or full multi-link constraint, and/or other factors.

Figure 16:
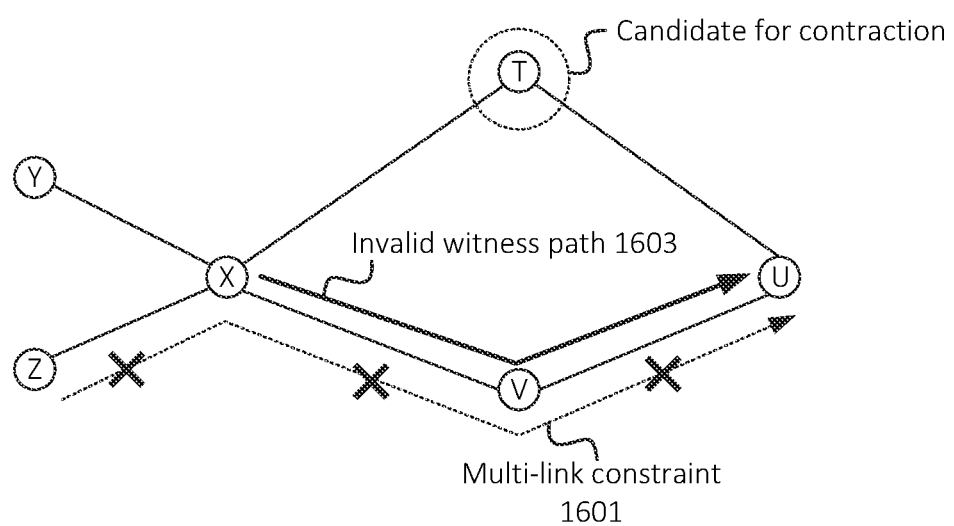
FIG. 16 illustrates an example of determining whether a potential witness path for a candidate shortcut is valid, based on a multi-link constraint that is partially included in the potential witness path, in accordance with some embodiments.

For example, in some embodiments, the inclusion of a portion of a multi-link constraint in a potential witness path may invalidate the witness path when determining whether such path is a valid witness with respect to a given candidate shortcut link. As shown in FIG. 16, for instance, multi-link constraint 1601 may include a constraint against the sequence of links: Link(ZX), Link(XV), and Link(VU). Further, in this example, assume that Node T is contracted from the node map, which would result in the potential creation of a shortcut Link(XU) that represents Path(XTU). Assuming that Path(XVU) is associated with a lower cost than Path(XTU), Path(XVU) (e.g., potential witness path 1603) may be a potential witness for the candidate shortcut Link(XU) that represents Path(XTU) and contracts Node T.

Here, one or more situations exist in which Path(XVU) includes at least a portion of a multi-link constraint. For example, entering Node X from Node Z would result in multi-link constraint 1601 being satisfied (thus increasing the cost of such path), while entering Node X from Node Y would not result in multi-link constraint 1601 being satisfied. Thus, even though some situations exist in which Path(XVU) would be a lower cost than a shortcut Link(XU) that represents Path(XTU), other situations exist in which Path(XVU) would be a higher cost than the shortcut Link (XU) that represents Path(XTU). As such, Path(XVU) may be an invalid witness path for the shortcut Link(XU) that represents Path(XTU). Accordingly, in some embodiments, the shortcut Link(XU) may be added to the node map to represent a path via contracted Node T (e.g., Path(XTU)), as some situations exist where Path(XTU) would be a lower cost than candidate (e.g., invalid) witness Path(XVU).

Figure 17:
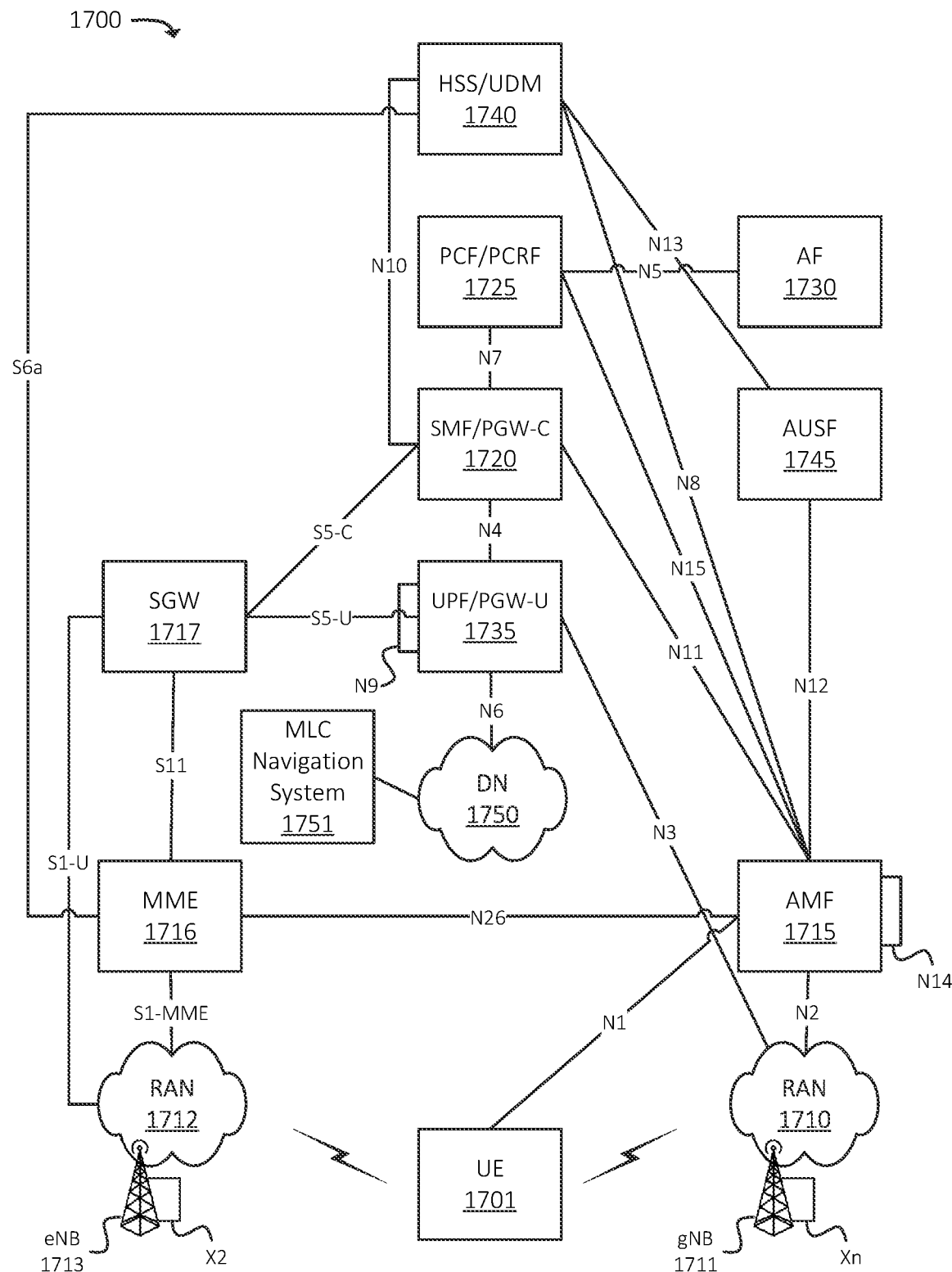
FIG. 17 illustrates an example environment in which one or more embodiments, described herein, may be implemented.

FIG. 17 illustrates an example environment 1700, in which one or more embodiments may be implemented. In some embodiments, environment 1700 may correspond to a Fifth Generation ("5G") network, and/or may include elements of a 5G network. In some embodiments, environment 1700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1700 may include UE 1701, RAN 1710 (which may include one or more Next Generation Node Bs ("gNBs") 1711), RAN 1712 (which may include one or more one or more evolved Node Bs ("eNBs") 1713), and various network functions such as Access and Mobility Management Function ("AMF") 1715, Mobility Management Entity ("MME") 1716, Serving Gateway ("SGW") 1717, Session Management Function ("SMF")/Packet Data Network ("PDN") Gateway ("PGW")-Control plane function ("PGW-C") 1720, Policy Control Function ("PCF")/Policy Charging and Rules Function ("PCRF") 1725, Application Function ("AF") 1730, User Plane Function ("UPF")/PGW-User plane function ("PGW-U") 1735, Home Subscriber Server ("HSS")/Unified Data Management ("UDM") 1740, and Authentication Server Function ("AUSF") 1745. Environment 1700 may also include one or more networks, such as Data Network ("DN") 1750. Environment 1700 may include one or more additional devices or systems communicatively coupled to one or more networks (e.g., DN 1750), such as Multi-Link Constraint ("MLC") Navigation System 1751.

The example shown in FIG. 17 illustrates one instance of each network component or function (e.g., one instance of SMF/PGW-C 1720, PCF/PCRF 1725, UPF/PGW-U 1735, HSS/UDM 1740, and/or 1745). In practice, environment 1700 may include multiple instances of such components or functions. For example, in some embodiments, environment 1700 may include multiple "slices" of a core network, where each slice includes a discrete set of network functions (e.g., one slice may include a first instance of SMF/PGW-C 1720, PCF/PCRF 1725, UPF/PGW-U 1735, HSS/UDM 1740, and/or 1745, while another slice may include a second instance of SMF/PGW-C 1720, PCF/PCRF 1725, UPF/PGW-U 1735, HSS/UDM 1740, and/or 1745). The different slices may provide differentiated levels of service, such as service in accordance with different Quality of Service ("QoS") parameters.

The quantity of devices and/or networks, illustrated in FIG. 17, is provided for explanatory purposes only. In practice, environment 1700 may include additional devices and/or networks, fewer devices and/or networks, different devices and/or networks, or differently arranged devices and/or networks than illustrated in FIG. 17. For example, while not shown, environment 1700 may include devices that facilitate or enable communication between various components shown in environment 1700, such as routers, modems, gateways, switches, hubs, etc. Alternatively, or additionally, one or more of the devices of environment 1700 may perform one or more network functions described as being performed by another one or more of the devices of environment 1700. Devices of environment 1700 may interconnect with each other and/or other devices via wired connections, wireless connections, or a combination of wired and wireless connections. In some implementations, one or more devices of environment 1700 may be physically integrated in, and/or may be physically attached to, one or more other devices of environment 1700.

UE 1701 may include a computation and communication device, such as a wireless mobile communication device that is capable of communicating with RAN 1710, RAN 1712, and/or DN 1750. UE 1701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1701 may send traffic to and/or receive traffic (e.g., user plane traffic) from DN 1750 via RAN 1710, RAN 1712, and/or UPF/PGW-U 1735.

RAN 1710 may be, or may include, a 5G RAN that includes one or more base stations (e.g., one or more gNBs 1711), via which UE 1701 may communicate with one or more other elements of environment 1700. UE 1701 may communicate with RAN 1710 via an air interface (e.g., as provided by gNB 1711). For instance, RAN 1710 may receive traffic (e.g., voice call traffic, data traffic, messaging traffic, signaling traffic, etc.) from UE 1701 via the air interface, and may communicate the traffic to UPF/PGW-U 1735, and/or one or more other devices or networks. Similarly, RAN 1710 may receive traffic intended for UE 1701 (e.g., from UPF/PGW-U 1735, AMF 1715, and/or one or more other devices or networks) and may communicate the traffic to UE 1701 via the air interface.

RAN 1712 may be, or may include, a LTE RAN that includes one or more base stations (e.g., one or more eNBs 1713), via which UE 1701 may communicate with one or more other elements of environment 1700. UE 1701 may communicate with RAN 1712 via an air interface (e.g., as provided by eNB 1713). For instance, RAN 1710 may receive traffic (e.g., voice call traffic, data traffic, messaging traffic, signaling traffic, etc.) from UE 1701 via the air interface, and may communicate the traffic to UPF/PGW-U 1735, and/or one or more other devices or networks. Similarly, RAN 1710 may receive traffic intended for UE 1701 (e.g., from UPF/PGW-U 1735, SGW 1717, and/or one or more other devices or networks) and may communicate the traffic to UE 1701 via the air interface.

AMF 1715 may include one or more devices, systems, Virtualized Network Functions ("VNFs"), etc., that perform operations to register UE 1701 with the 5G network, to establish bearer channels associated with a session with UE 1701, to hand off UE 1701 from the 5G network to another network, to hand off UE 1701 from the other network to the 5G network, manage mobility of UE 1701 between RANs 1710 and/or gNBs 1711, and/or to perform other operations. In some embodiments, the 5G network may include multiple AMFs 1715, which communicate with each other via the N14 interface (denoted in FIG. 17 by the line marked "N14" originating and terminating at AMF 1715).

MME 1716 may include one or more devices, systems, VNFs, etc., that perform operations to register UE 1701 with the EPC, to establish bearer channels associated with a session with UE 1701, to hand off UE 1701 from the EPC to another network, to hand off UE 1701 from another network to the EPC, manage mobility of UE 1701 between RANs 1712 and/or eNBs 1713, and/or to perform other operations.

SGW 1717 may include one or more devices, systems, VNFs, etc., that aggregate traffic received from one or more eNBs 1713 and send the aggregated traffic to an external network or device via UPF/PGW-U 1735. Additionally, SGW 1717 may aggregate traffic received from one or more UPF/PGW-Us 1735 and may send the aggregated traffic to one or more eNBs 1713. SGW 1717 may operate as an anchor for the user plane during inter-eNB handovers and as an anchor for mobility between different telecommunication networks or RANs (e.g., RANs 1710 and 1712).

SMF/PGW-C 1720 may include one or more devices, systems, VNFs, etc., that gather, process, store, and/or provide information in a manner described herein. SMF/PGW-C 1720 may, for example, facilitate in the establishment of communication sessions on behalf of UE 1701. In some embodiments, the establishment of communications sessions may be performed in accordance with one or more policies provided by PCF/PCRF 1725.

PCF/PCRF 1725 may include one or more devices, systems, VNFs, etc., that aggregate information to and from the 5G network and/or other sources. PCF/PCRF 1725 may receive information regarding policies and/or subscriptions from one or more sources, such as subscriber databases and/or from one or more users (such as, for example, an administrator associated with PCF/PCRF 1725).

AF 1730 may include one or more devices, systems, VNFs, etc., that receive, store, and/or provide information that may be used in determining parameters (e.g., quality of service parameters, charging parameters, or the like) for certain applications.

UPF/PGW-U 1735 may include one or more devices, systems, VNFs, etc., that receive, store, and/or provide data (e.g., user plane data). For example, UPF/PGW-U 1735 may receive user plane data (e.g., voice call traffic, data traffic, etc.), destined for UE 1701, from DN 1750, and may forward the user plane data toward UE 1701 (e.g., via RAN 1710, SMF/PGW-C 1720, and/or one or more other devices). In some embodiments, multiple UPFs 1735 may be deployed (e.g., in different geographical locations), and the delivery of content to UE 1701 may be coordinated via the N17 interface (e.g., as denoted in FIG. 17 by the line marked "N17" originating and terminating at UPF/PGW-U 1735). Similarly, UPF/PGW-U 1735 may receive traffic from UE 1701 (e.g., via RAN 1710, SMF/PGW-C 1720, and/or one or more other devices), and may forward the traffic toward DN 1750. In some embodiments, UPF/PGW-U 1735 may communicate (e.g., via the N4 interface) with SMF/PGW-C 1720, regarding user plane data processed by UPF/PGW-U 1735.

HSS/UDM 1740 and AUSF 1745 may include one or more devices, systems, VNFs, etc., that manage, update, and/or store, in one or more memory devices associated with AUSF 1745 and/or HSS/UDM 1740, profile information associated with a subscriber. AUSF 1745 and/or HSS/UDM 1740 may perform authentication, authorization, and/or accounting operations associated with the subscriber and/or a communication session with UE 1701.

DN 1750 may include one or more wired and/or wireless networks. For example, DN 1750 may include an Internet Protocol ("IP")-based PDN, a wide area network ("WAN") such as the Internet, a private enterprise network, and/or one or more other networks. UE 1701 may communicate, through DN 1750, with data servers, other UEs 1701, and/or to other servers or applications that are coupled to DN 1750. DN 1750 may be connected to one or more other networks, such as a public switched telephone network ("PSTN"), a public land mobile network ("PLMN"), and/or another network. DN 1750 may be connected to one or more devices, such as content providers, applications, web servers, and/or other devices, with which UE 1701 may communicate.

MLC Navigation System 1751 may include one or more devices, systems, VNFs, etc. that perform one or more operations described herein. For example, MLC Navigation System 1751 may generate one or more node maps based on one or more maps or other information associated with physical roads and intersections between the roads. In some embodiments, MLC Navigation System 1751 may generate node maps based on other information, and/or for systems other than roadways. In some embodiments, MLC Navigation System 1751 may generate node maps using contraction hierarchy techniques, including techniques described herein whereby MLC Navigation System 1751 includes and/or utilizes multi-link constraints for determining costs associated with links, paths, etc. through the node maps. In some embodiments, MLC Navigation System 1751 may receive queries, based on which MLC Navigation System 1751 may generate or determine one or more paths through the node map (e.g., a lowest cost path).

Figure 18:
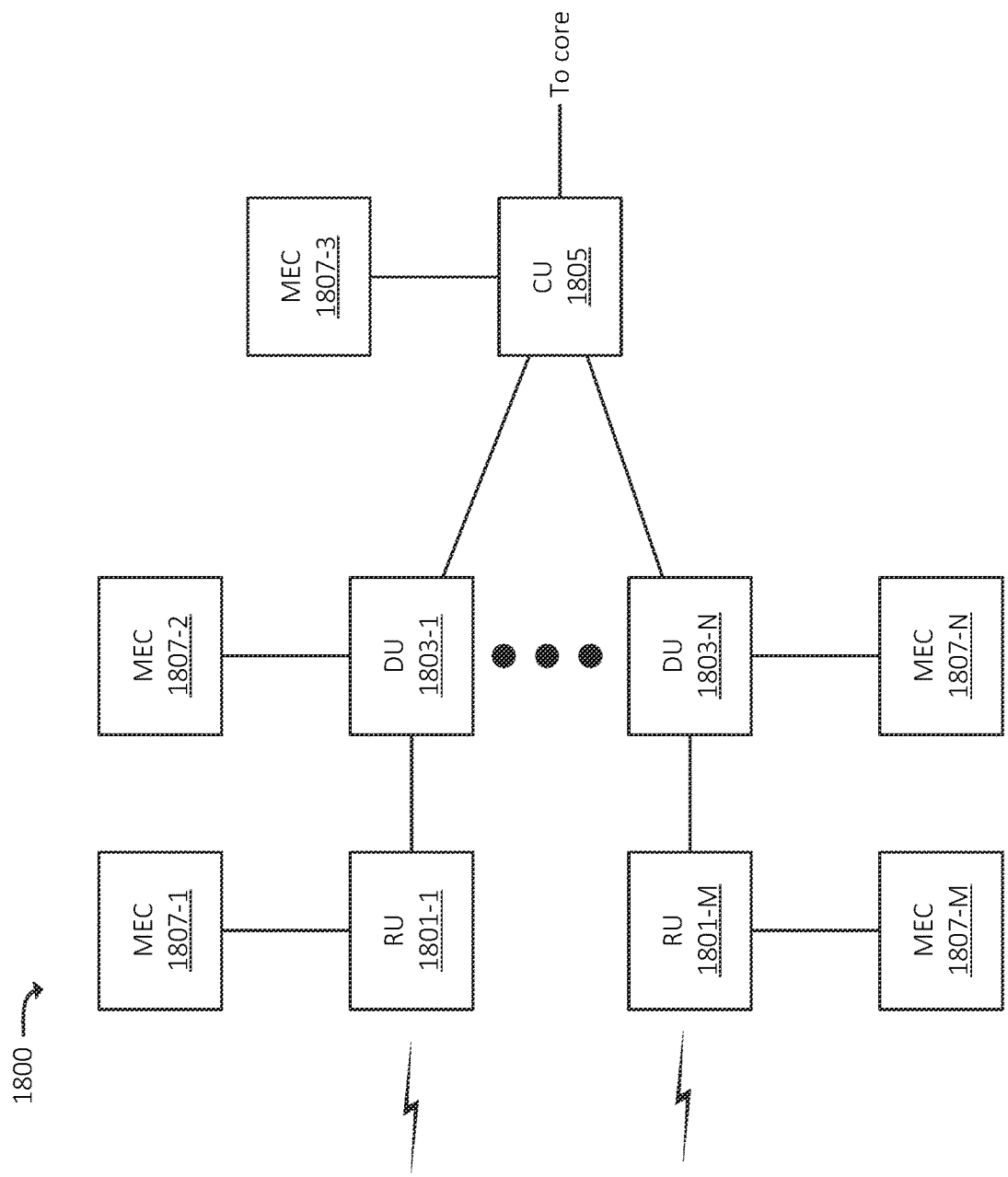
FIG. 18 illustrates an example arrangement of a radio access network ("RAN"), in accordance with some embodiments.

FIG. 18 illustrates an example Distributed Unit ("DU") network 1800, which may be included in and/or implemented by one or more RANs (e.g., RAN 1710, RAN 1712, or some other RAN). In some embodiments, a particular RAN may include one DU network 1800. In some embodiments, a particular RAN may include multiple DU networks 1800. In some embodiments, DU network 1800 may correspond to a particular gNB 1711 of a 5G RAN (e.g., RAN 1710). In some embodiments, DU network 1800 may correspond to multiple gNBs 1711. In some embodiments, DU network 1800 may correspond to one or more other types of base stations of one or more other types of RANs. As shown, DU network 1800 may include Central Unit ("CU") 1805, one or more Distributed Units ("DUs") 1803-1 through 1803-N (referred to individually as "DU 1803," or collectively as "DUs 1803"), and one or more Radio Units ("RUs") 1801-1 through 1801-M (referred to individually as "RU 1801," or collectively as "RUs 1801").

CU 1805 may communicate with a core of a wireless network (e.g., may communicate with one or more of the devices or systems described above with respect to FIG. 17, such as AMF 1715 and/or UPF/PGW-U 1735). In the uplink direction (e.g., for traffic from UEs 1701 to a core network), CU 1805 may aggregate traffic from DUs 1803, and forward the aggregated traffic to the core network. In some embodiments, CU 1805 may receive traffic according to a given protocol (e.g., Radio Link Control ("RLC")) from DUs 1803, and may perform higher-layer processing (e.g., may aggregate/process RLC packets and generate Packet Data Convergence Protocol ("PDCP") packets based on the RLC packets) on the traffic received from DUs 1803.

In accordance with some embodiments, CU 1805 may receive downlink traffic (e.g., traffic from the core network) for a particular UE 1701, and may determine which DU(s) 1803 should receive the downlink traffic. DU 1803 may include one or more devices that transmit traffic between a core network (e.g., via CU 1805) and UE 1701 (e.g., via a respective RU 1801). DU 1803 may, for example, receive traffic from RU 1801 at a first layer (e.g., physical ("PHY") layer traffic, or lower PHY layer traffic), and may process/aggregate the traffic to a second layer (e.g., upper PHY and/or RLC). DU 1803 may receive traffic from CU 1805 at the second layer, may process the traffic to the first layer, and provide the processed traffic to a respective RU 1801 for transmission to UE 1701.

RU 1801 may include hardware circuitry (e.g., one or more RF transceivers, antennas, radios, and/or other suitable hardware) to communicate wirelessly (e.g., via an RF interface) with one or more UEs 1701, one or more other DUs 1803 (e.g., via RUs 1801 associated with DUs 1803), and/or any other suitable type of device. In the uplink direction, RU 1801 may receive traffic from UE 1701 and/or another DU 1803 via the RF interface and may provide the traffic to DU 1803. In the downlink direction, RU 1801 may receive traffic from DU 1803, and may provide the traffic to UE 1701 and/or another DU 1803.

RUs 1801 may, in some embodiments, be communicatively coupled to one or more Multi-Access/Mobile Edge Computing ("MEC") devices, referred to sometimes herein simply as "MECs" 1807. For example, RU 1801-1 may be communicatively coupled to MEC 1807-1, RU 1801-M may be communicatively coupled to MEC 1807-M, DU 1803-1 may be communicatively coupled to MEC 1807-2, DU 1803-N may be communicatively coupled to MEC 1807-N, CU 1805 may be communicatively coupled to MEC 1807-3, and so on. MECs 1807 may include hardware resources (e.g., configurable or provisionable hardware resources) that may be configured to provide services and/or otherwise process traffic to and/or from UE 1701, via a respective RU 1801.

For example, RU 1801-1 may route some traffic, from UE 1701, to MEC 1807-1 instead of to a core network (e.g., via DU 1803 and CU 1805). MEC 1807-1 may process the traffic, perform one or more computations based on the received traffic, and may provide traffic to UE 1701 via RU 1801-1. In this manner, ultra-low latency services may be provided to UE 1701, as traffic does not need to traverse DU 1803, CU 1805, and an intervening backhaul network between DU network 1800 and the core network. In some embodiments, MEC 1807 may include, and/or may implement, some or all of the functionality described above with respect to MLC Navigation System 1751, UPF 1735, and/or one or more other devices, systems, VNFs, CNFs, etc.

Figure 19:
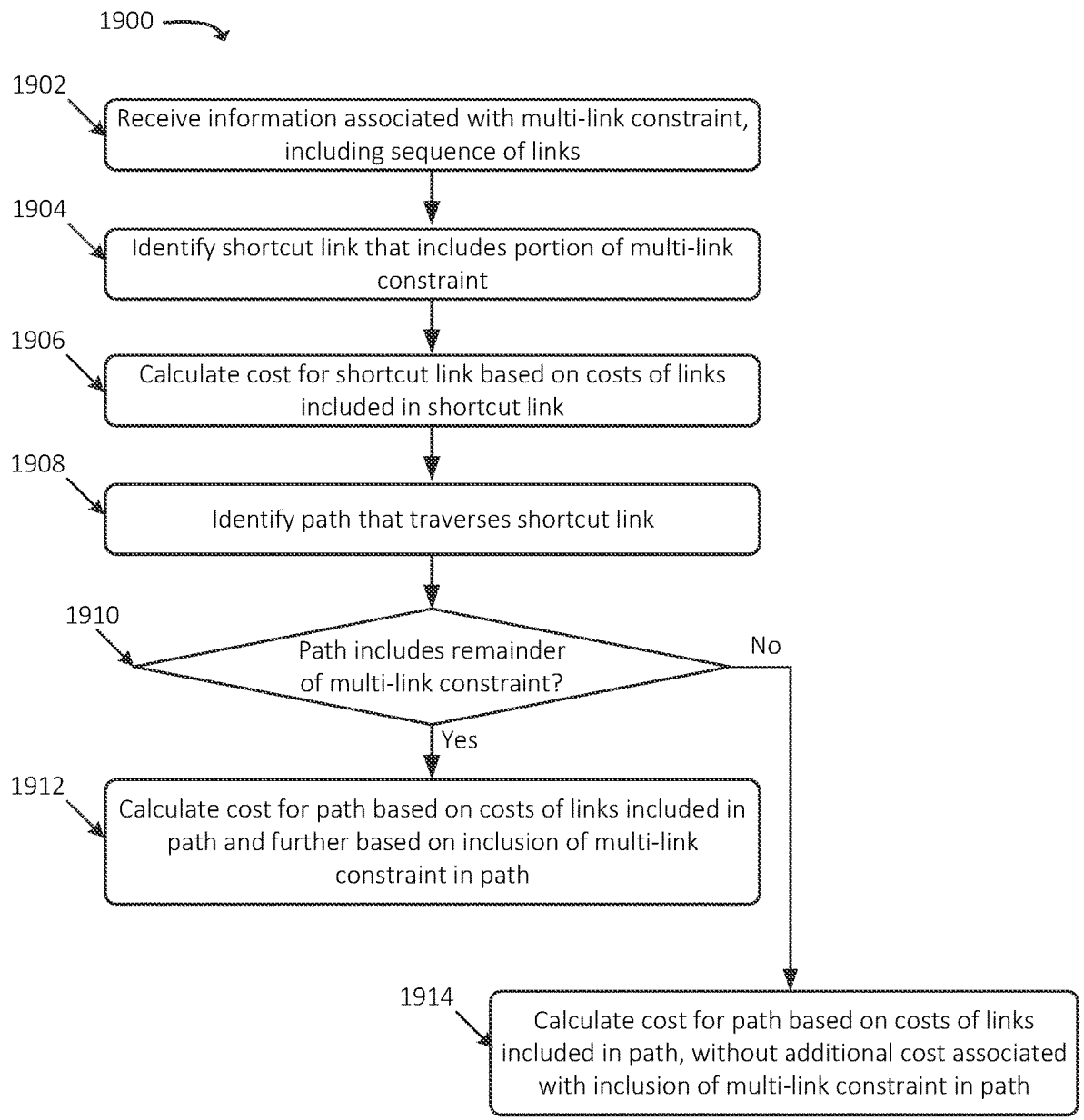
FIG. 19 illustrates an example process for calculating a cost of a path based on whether the path includes a shortcut with a partial multi-link constraint, in accordance with some embodiments.

FIG. 19 illustrates an example process 1900 for calculating a cost of a path based on whether the path includes a shortcut with a partial multi-link constraint. In some embodiments, some or all of process 1900 may be performed by MLC Navigation System 1751. In some embodiments, one or more other devices may perform some or all of process 1900 in concert with, and/or in lieu of, MLC Navigation System 1751.

Process 1900 may include receiving (at 1902) information associated with a multi-link constraint, including a sequence of links. For example, as discussed above, a multi-link constraint may specify a path through a node map, a particular sequence of nodes in the node map, a set of consecutive traversals of nodes through the node map, etc. As discussed above, a path through the node map that includes this sequence of links may be considered as including the multi-link constraint.

Process 1900 may also include identifying (at 1904) a shortcut link that includes a portion of the multi-link constraint. For example, a particular shortcut link may have been generated based on contracting a particular node of the node map. The particular node may be connected to at least two other nodes of the node map. The contracting may include generating a shortcut link between the two other nodes, where the shortcut link represents a link between a first one of the two nodes and the second node, through the contracted node. In some embodiments, the shortcut link may include a combination, joining, etc. of a first link between the first node and the contracted node, and a second link between the second node and the contracted node.

In some situations, a link between one of the nodes and the contracted node may be a particular link associated with the multi-link constraint. As such, the shortcut link may include a portion of the multi-link constraint, may include a partial multi-link constraint, may partially include the multi-link constraint, etc.

Process 1900 may further include calculating (at 1906) a cost for the shortcut link based on costs of links included in the shortcut link. For example, each link between nodes of the node map may be associated with a particular cost, which may represent travel time, fuel consumption, and/or some other type of cost, score, value, etc. For example, the cost for the shortcut link may be based on the costs of the first link between the first node and the contracted node, and the second link between the second node and the contracted node.

Process 1900 may additionally include identifying (at 1908) a path that traverses the shortcut link. For example, such path may be a candidate path determined based on a request to navigate from a source node of the node map to a target node of the node map. In some embodiments, such path may be identified as part of a pre-compute operation (e.g., not in response to such a request) or some other suitable operation.

Process 1900 may also include determining (at 1910) whether the path includes the remainder of the multi-constraint link. For example, as discussed above, MLC Navigation System 1751 may determine whether the shortcut link includes the multi-link constraint at a start of the shortcut link, and may further determine whether a traversal of the path includes the remainder of the sequence of links associated with the multi-link constraint prior to entering the shortcut link. Additionally, or alternatively, MLC Navigation System 1751 may determine whether the shortcut link includes the multi-link constraint at an end of the shortcut link, and may further determine whether a traversal of the path includes the remainder of the sequence of links associated with the multi-link constraint after exiting the shortcut link. In some embodiments, MLC Navigation System 1751 may determine whether such traversals result in the remainder of the multi-link constraint, as well as the portion of the multi-link constraint included in the shortcut link, being traversed consecutively.

If the path includes the remainder of the multi-link constraint (at 1910—YES), then process 1900 may further include calculating (at 1912) a cost of the path based on costs of links included in the path and further based on the inclusion of the multi-link constraint in the path. For example, as discussed above, an additional cost may be added to the path based on the inclusion of the multi-link constraint in the path. Such additional cost may thus cause the path to have a higher cost than if the same path were not associated with the multi-link constraint.

If, on the other hand, the path does not include the remainder of the multi-link constraint (at 1910—NO, then process 1900 may additionally include calculating (at 1914) the cost of the path based on costs of links included in the path, without the additional cost associated with the inclusion of the multi-link constraint in the path. In some embodiments, such determination (at 1910—NO) may be made even if the path includes all of the links associated with the multi-link constraint, but such links are not traversed in the particular sequence associated with the multi-link constraint.

Figure 20:
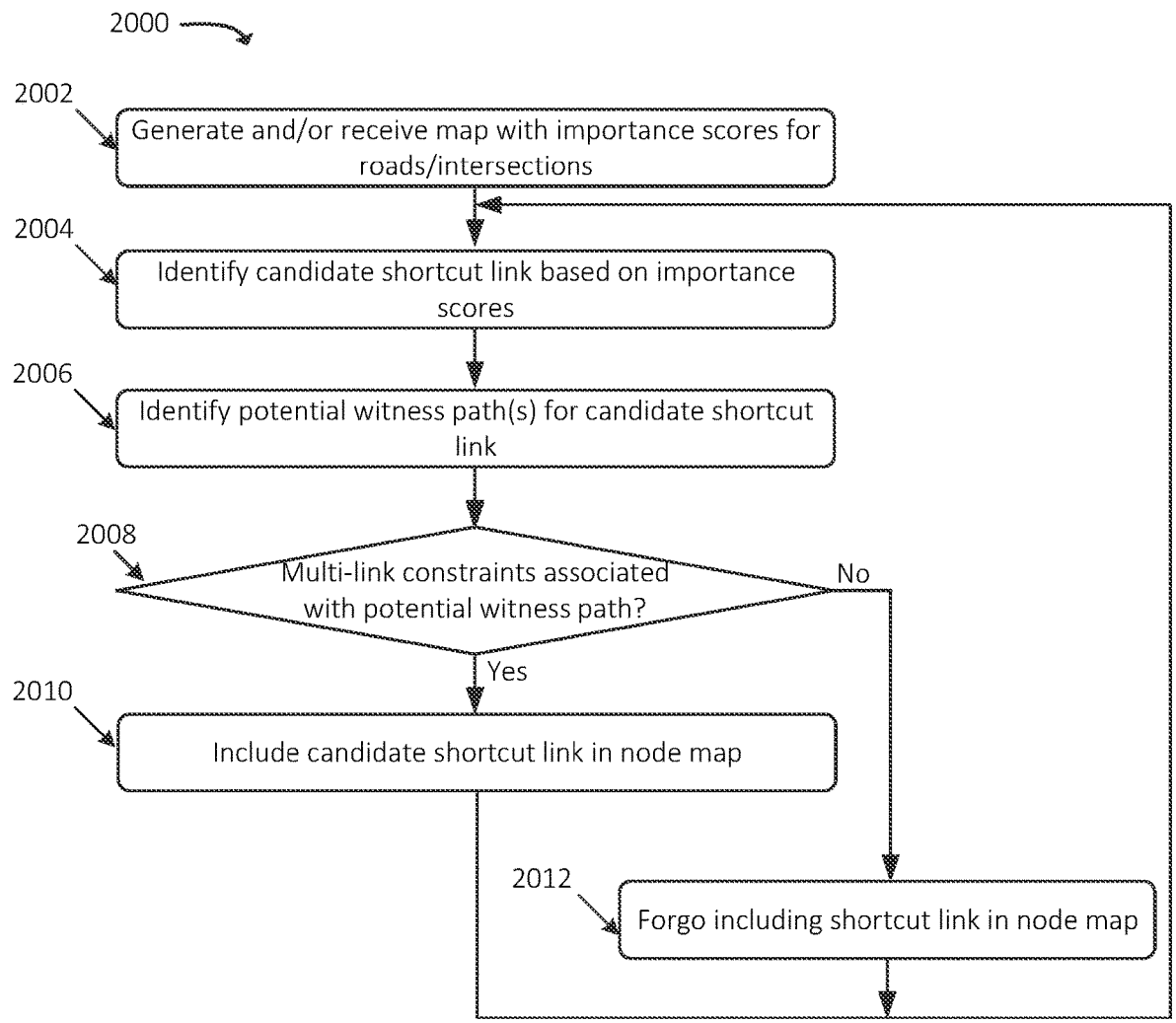
FIG. 20 illustrates an example process for determining whether to include a candidate shortcut link a node map based on whether a potential witness path for the candidate shortcut link includes a partial multi-link constraint, in accordance with some embodiments.

FIG. 20 illustrates an example process 2000 for determining whether to include a candidate shortcut link a node map based on whether a potential witness path for the candidate shortcut link includes a partial multi-link constraint. In some embodiments, some or all of process 2000 may be performed by MLC Navigation System 1751. In some embodiments, one or more other devices may perform some or all of process 2000 in concert with, and/or in lieu of, MLC Navigation System 1751.

Process 2000 may include generating and/or receiving (at 2002) a map with priority scores for roads and/or intersections depicted in the map. For example, MLC Navigation System 1751 may receive a map (e.g., as similarly discussed above with respect to map 101). The map may be associated with roads and intersections, or other types of pathways. For example, in some embodiments, the map may be associated with pipelines, circuits, railway tracks, and/or other types of pathways that may be traversed. In some embodiments, MLC Navigation System 1751 may determine and/or may receive importance scores for some or all of the roads and/or intersections. As noted above, importance scores may be associated with one or more factors of the roads and/or intersections. For example, a road with a relatively "low" importance may be a relatively small road, may have a relatively small traffic volume, may be a residential road, and/or may have other suitable attributes. As another example, a road with a relatively "high" importance may be a relatively large road (e.g., a large quantity of lanes, a relatively long length, etc.), may have a relatively large traffic volume, may be a highway, and/or may have other suitable attributes.

Process 2000 may further include identifying (at 2004) a candidate shortcut link based on the importance scores. In some embodiments, MLC Navigation System 1751 may identify a candidate shortcut link based on one or more factors in addition to, or in lieu of, importance scores. For the sake of brevity, importance scores are discussed herein as the factor based on which candidate shortcut links are identified. For example, MLC Navigation System 1751 may identify one or more links (e.g., a single link or a series of links) with relatively low importance scores. For example, MLC Navigation System 1751 may identify one or more links with importance scores below a threshold, and/or may identify one or more links that have a lowest importance score (or set of importance scores) and that have not yet been analyzed. One or more nodes associated with such links may be contracted from the node map, and operations below may be used to determine whether to include one or more shortcuts, that represent paths through the contracted one or more nodes, in the node map. Some or all of process 2000 may be performed iteratively, and MLC Navigation System 1751 may perform iterations in a sequence that is based on ascending importance scores of links or sets of links.

Process 2000 may additionally include identifying (at 2006) one or more witness paths for the candidate shortcut link. For example, MLC Navigation System 1751 may identify one or more paths, which do not include a path through the candidate shortcut link, that have a lower cost than a candidate shortcut path. As noted above, the "candidate shortcut path" may include a path through the candidate shortcut link. In some embodiments, the candidate shortcut path may include only the shortcut link. As similarly noted above, the candidate shortcut link may be evaluated in a single direction, or in multiple directions.

Although not discussed here, situations may arise where a witness path is not identified for a given candidate shortcut link. In such situations, MLC Navigation System 1751 may add the candidate shortcut link to the node map. For example, the candidate shortcut link may be added, as the absence of a valid witness link may indicate that the shortcut link is an optimal path between the starting and ending nodes of the candidate shortcut link. For the sake of example, the description of process 2000 assumes that one or more witness paths are found (at 2006) for the candidate shortcut link.

Process 2000 may also include determining (at 2008) whether any potential multi-link constraints are associated with a potential witness path. For example, MLC Navigation System 1751 may determine that a potential witness path includes a portion of a sequence of links associated with a multi-link constraint, and/or includes the full sequence of links associated with the multi-link constraint.

If the potential witness path is associated with a multi-link constraint (at 2008—YES), which may include a full or partial multi-link constraint, then MLC Navigation System 1751 may include (at 2010) the candidate shortcut link in the node map, as similarly described above. For example, such shortcut link may be included in the node map, as one or more situations may exist where traversing the shortcut link has a lower cost than traversing the witness path (e.g., based on the additional cost associated with the multi-link constraint associated with the multi-link constraint).

If on the other hand, the potential witness path is not associated with a multi-link constraint (at 2008—NO), then MLC Navigation System 1751 may forgo (at 2012) including the candidate shortcut link in the node map, as similarly described above. For example, the candidate shortcut link may not be included in the node map, no situations may exist where the potential witness path has a higher cost, due to including a multi-link constraint, than the candidate shortcut link. In other words, MLC Navigation System 1751 may refrain from using a shortcut link to represent one or more links to and/or from a contracted node, as traversing the potential witness path would be a lower cost than such shortcut link would be.

In some embodiments, while operation 2008 is described in the context of including (at 2008—YES) or omitting (2008—NO) a shortcut link from the node map based on whether a witness path for the shortcut link is associated with a multi-link constraint, such determination may be based on one or more other factors. For example, situations may arise in which a witness path is not associated with any multi-link constraints (at 2008—NO), but is still associated with a higher cost than a path via the candidate shortcut link. In such situations, the candidate shortcut link may be included in the node map irrespective of the determination (at 2008—NO) that the one or more witness paths are not associated with a multi-link constraint. For example, the candidate shortcut link may nonetheless be included in the node map based on the higher cost associated with the one or more witness paths (e.g., the shortcut link may be a lower cost path than the one or more witness paths, even if the one or more witness paths do not include a multi-link constraint).

Figure 21:
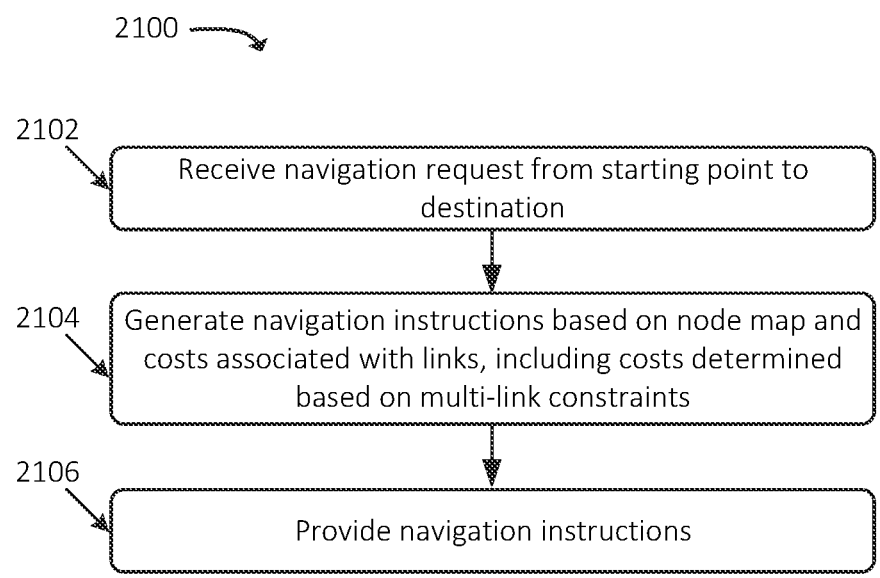
FIG. 21 illustrates an example process for using a node map, including one or more conditional shortcut links, to generate navigation instructions in response to a navigation request.

FIG. 21 illustrates an example process 2100 for using a node map, including one or more multi-link constraints, to generate navigation instructions in response to a navigation request. In some embodiments, some or all of process 2100 may be performed by MLC Navigation System 1751. In some embodiments, one or more other devices may perform some or all of process 2100 in concert with, and/or in lieu of, MLC Navigation System 1751.

As shown, process 2100 may include receiving (at 2102) a navigation request. For example, MLC Navigation System 1751 may receive a request to navigate from a starting point that is associated with particular node, in a node map, to a destination that is associated with another node in the node map. As discussed above, the node map may include and/or may be associated with one or more multi-link constants, costs associated with links, etc. In some embodiments, the node map may be associated with other types of constraints, features, rules, etc., which may be evaluated in addition to the techniques described herein.

Process 2100 may further include generating (at 2104) navigation instructions based on the node map. For example, MLC Navigation System 1751 may use a bidirectional search or some other suitable type of search to identify one or more paths from the starting node to the ending node. For example, MLC Navigation System 1751 may perform one or more searches originating from the starting node and/or the ending node. In some embodiments, the bidirectional search may include identifying nodes or paths that have a higher importance score than a present node, and iteratively continuing to search for nodes or paths with higher importance score than the present node. In this manner, one or more paths originating from the starting node may intersect with one or more paths originating from the ending node, and MLC Navigation System 1751 may select a particular complete path (e.g., an intersection of a path originating from the starting node and a path originating from the ending node) based on cumulative cost and/or one or more other factors. As discussed above, the cost of a given path may be calculated based on whether such path or link includes one or more multi-link constraints.

Process 2100 may additionally include providing (at 2106) the navigation instructions. For example, MLC Navigation System 1751 may provide an indication of the path (determined at 2104) to a requesting device, such as UE 1701. UE 1701 may, in turn, present the navigation instructions via a display screen, audibly present the navigation instructions, or perform one or more other suitable operations to present the navigation instructions.

Figure 22:
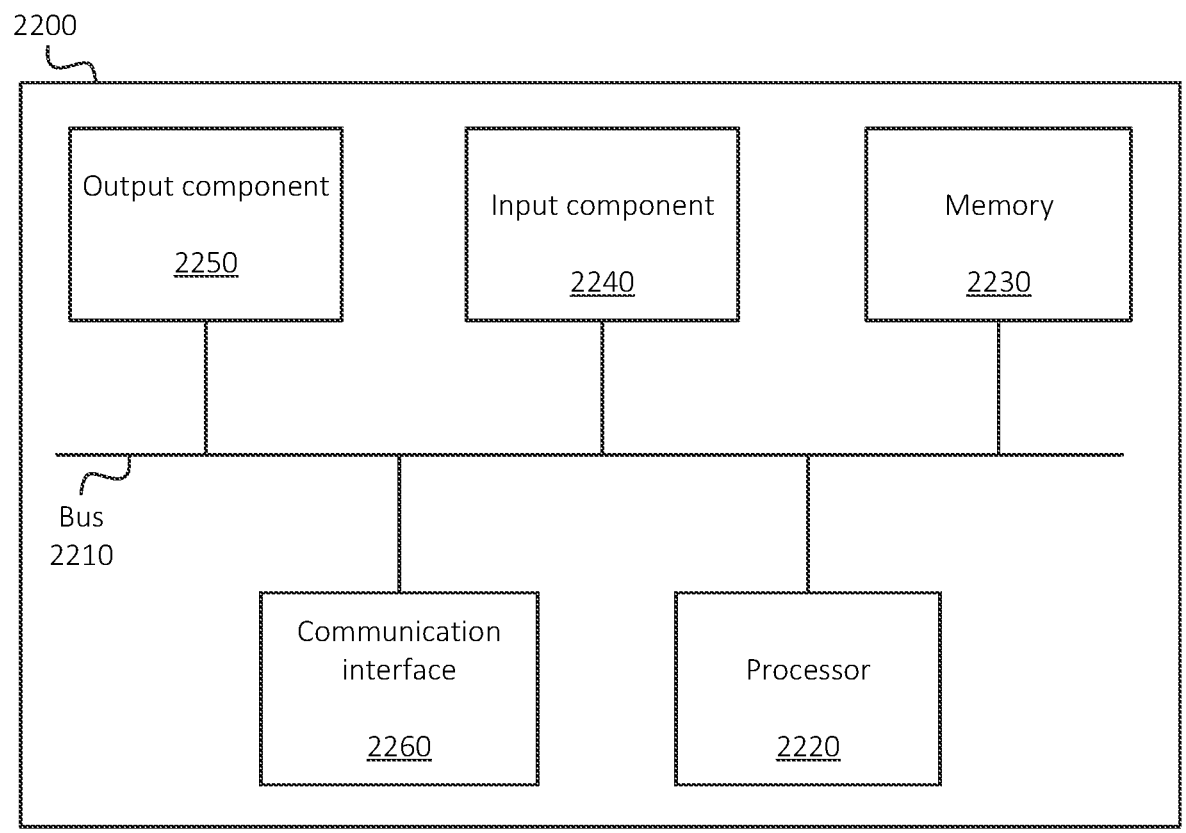
FIG. 22 illustrates example components of one or more devices, in accordance with one or more embodiments described herein.

FIG. 22 illustrates example components of device 2200. One or more of the devices described above may include one or more devices 2200. Device 2200 may include bus 2210, processor 2220, memory 2230, input component 2240, output component 2250, and communication interface 2260. In another implementation, device 2200 may include additional, fewer, different, or differently arranged components.

Bus 2210 may include one or more communication paths that permit communication among the components of device 2200. Processor 2220 may include a processor, microprocessor, or processing logic that may interpret and execute instructions. In some embodiments, processor 2220 may be or may include one or more hardware processors. Memory 2230 may include any type of dynamic storage device that may store information and instructions for execution by processor 2220, and/or any type of non-volatile storage device that may store information for use by processor 2220.

Input component 2240 may include a mechanism that permits an operator to input information to device 2200 and/or other receives or detects input from a source external to 2240, such as a touchpad, a touchscreen, a keyboard, a keypad, a button, a switch, a microphone or other audio input component, etc. In some embodiments, input component 2240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2250 may include a mechanism that outputs information to the operator, such as a display, a speaker, one or more light emitting diodes ("LEDs"), etc.

Communication interface 2260 may include any transceiver-like mechanism that enables device 2200 to communicate with other devices and/or systems. For example, communication interface 2260 may include an Ethernet interface, an optical interface, a coaxial interface, or the like. Communication interface 2260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 2200 may include more than one communication interface 2260. For instance, device 2200 may include an optical interface and an Ethernet interface.

Device 2200 may perform certain operations relating to one or more processes described above. Device 2200 may perform these operations in response to processor 2220 executing software instructions stored in a computer-readable medium, such as memory 2230. A computer-readable medium may be defined as a non-transitory memory device. A memory device may include space within a single physical memory device or spread across multiple physical memory devices. The software instructions may be read into memory 2230 from another computer-readable medium or from another device. The software instructions stored in memory 2230 may cause processor 2220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-16 and 19-21) the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
  one or more processors configured to:
    receive information regarding a plurality of nodes and links between the plurality of nodes, wherein the information regarding the plurality of nodes and links includes:
      a cost associated with each link of the plurality of links, and
      a multi-link constraint that indicates a particular sequence of links between a particular set of nodes of the plurality of nodes, wherein the particular sequence of links includes:
a first link between a first node and a second node, wherein the first link is associated with a first cost, and
a second link between the second node and a third node, wherein the second link is associated with a second cost;
generate a between the second node and a fourth node, wherein the shortcut link is based on the second link and a third link between the third node and the fourth node, wherein the third link is associated with a third cost;
calculate a fourth cost for the shortcut link based on the second cost associated with the second link and the third cost associated with the third link;
generate a first path that includes the shortcut link and the first link;
determine that the first path includes the particular sequence of links indicated by the multi-link constraint, wherein determining that the first path includes the particular sequence of links includes determining that the shortcut link, included in the first path, includes the second link;
calculate a fifth cost for the first path based on:
the first cost associated with the first link,
the fourth cost for the shortcut link, and
an additional cost based on determining that the first path includes the particular sequence of links indicated by the multi-link constraint;
receive, via a network, a request for navigation instructions from a starting point to a destination;
identify that the first path is a first candidate path from the starting point to the destination;
identify a second path that is a second candidate path from the starting point to the destination;
identify a sixth cost associated with the second path;
compare the fifth cost, associated with the first path, with the sixth cost associated with the second path;
select the first path based on comparing the fifth cost to the sixth cost;
generate the requested set of navigation instructions based on the first path; and
output, via the network, the requested navigation instructions to a fleet management system that manages one or more vehicles to traverse one or more routes based on the navigation instructions.

2. The device of claim 1, wherein the one or more processors are further configured to:
receive a query for a third path from a fifth node to a sixth node; and
determine the third path from the fifth node to the sixth node, wherein the third path does not include the additional cost associated with the first path.

3. The device of claim 1, wherein the shortcut link is a first shortcut link, wherein the one or more processors are further configured to:
remove a fifth node from the plurality of nodes;
determine, based on removing the fifth node, whether to generate a second shortcut link to represent a path through the fifth node;
determine that a candidate witness path for the second shortcut link includes at least a portion of the multi-link constraint; and
generate, based on determining that the candidate witness path for the second shortcut link includes at least the portion of the multi-link constraint, the second shortcut link to represent the path through the fifth node.

4. The device of claim 3, wherein generating the second shortcut link is further based on determining that each candidate witness path for the second shortcut link:
includes one or more portions of the multi-link constraint, is associated a higher cost than the second shortcut link, or
includes one or more portions of the multi-link constraint and is associated with a higher cost than the second shortcut link.

5. The device of claim 1, wherein the particular sequence of links indicates that the first and second links of the multi-link constraint are consecutive links of the multi-link constraint, and wherein traversing the path includes traversing the first and second links of the multi-link constraint consecutively,
wherein calculating the fifth cost based on the additional cost is further based on determining that traversing the path includes traversing the first and second links of the multi-link constraint consecutively.

6. The device of claim 1,
wherein the particular sequence of links indicated by the multi-link constraint further includes the third link between the third node and the fourth node, and
wherein the additional cost is further based on determining that that the first path includes a consecutive traversal of the second link followed by the third link.

7. The device of claim 1, wherein the first path includes a particular set of links that are each associated with a respective cost, wherein the fifth cost for the first path is calculated further based on the respective cost for each link of the particular set of links.

8. The device of claim 1, wherein calculating the fifth cost for the first path includes:
calculating a sum of:
the first cost associated with the first link, and
the fourth cost for the shortcut link; and
modifying the sum of the first and fourth costs by the additional cost.

9. The device of claim 8, wherein modifying the sum of the first and fourth costs includes adding the additional cost to the sum of the first and fourth costs.

10. The device of claim 8, wherein modifying the sum of the first and fourth costs includes multiplying the additional cost and the sum of the first and fourth costs.

11. A non-transitory computer-readable medium, storing a plurality of processor-executable instructions to:
receive information regarding a plurality of nodes and links between the plurality of nodes, wherein the information regarding the plurality of nodes and links includes:
a cost associated with each link of the plurality of links, and
a multi-link constraint that indicates a particular sequence of links between a particular set of nodes of the plurality of nodes, wherein the particular sequence of links includes:
a first link between a first node and a second node, wherein the first link is associated with a first cost, and
a second link between the second node and a third node, wherein the second link is associated with a second cost;
generate a shortcut link between the second node and a fourth node, wherein the shortcut link is based on the second link and a third link between the third node and the fourth node, wherein the third link is associated with a third cost;
calculate a fourth cost for the shortcut link based on the second cost associated with the second link and the third cost associated with the third link;
generate a first path that includes the shortcut link and the first link;
determine that the first path includes the particular sequence of links indicated by the multi-link constraint, wherein determining that the first path includes the particular sequence of links includes determining that the shortcut link, included in the first path, includes the second link;
calculate a fifth cost for the first path based on:
the first cost associated with the first link,
the fourth cost for the shortcut link, and
an additional cost based on determining that the first path includes the particular sequence of links indicated by the multi-link constraint;
receive, via a network, a request for navigation instructions from a starting point to a destination;
identify that the first path is a first candidate path from the starting point to the destination;
identify a second path that is a second candidate path from the starting point to the destination;
identify a sixth cost associated with the second path;
compare the fifth cost, associated with the first path, with the sixth cost associated with the second path;
select the first path based on comparing the fifth cost to the sixth cost;
generate the requested set of navigation instructions based on the first path; and
output, via the network, the requested navigation instructions to a fleet management system that manages one or more vehicles to traverse one or more routes based on the navigation instructions.

12. The non-transitory computer-readable medium of claim 11, wherein the processor-executable instructions further include processor-executable instructions to:
receive a query for a third path from a fifth node to a sixth node; and
determine the third path from the fifth node to the sixth node, wherein the third path does not include the additional cost associated with the first path.

13. The non-transitory computer-readable medium of claim 11, wherein the shortcut link is a first shortcut link, wherein the plurality of processor-executable instructions further include processor-executable instructions to:
remove a fifth node from the plurality of nodes;
determine, based on removing the fifth node, whether to generate a second shortcut link to represent a path through the fifth node;
determine that a candidate witness path for the second shortcut link includes at least a portion of the multi-link constraint; and
generate, based on determining that the candidate witness path for the second shortcut link includes at least the portion of the multi-link constraint, the second shortcut link to represent the path through the fifth node.

14. The non-transitory computer-readable medium of claim 13, wherein generating the second shortcut link is further based on determining that each candidate witness path for the second shortcut link:
includes one or more portions of the multi-link constraint, is associated a higher cost than the second shortcut link, or
includes one or more portions of the multi-link constraint and is associated with a higher cost than the second shortcut link.

15. The non-transitory computer-readable medium of claim 11, wherein the particular sequence of links indicates that the first and second links of the multi-link constraint are consecutive links of the multi-link constraint, and wherein traversing the path includes traversing the first and second links of the multi-link constraint consecutively,
wherein calculating the fifth cost based on the additional cost is further based on determining that traversing the path includes traversing the first and second links of the multi-link constraint consecutively.

16. The non-transitory computer-readable medium of claim 11,
wherein the particular sequence of links indicated by the multi-link constraint further includes the third link between the third node and the fourth node, and
wherein the additional cost is further based on determining that that the first path includes a consecutive traversal of the second link followed by the third link.

17. The non-transitory computer-readable medium of claim 11, wherein the first path includes a particular set of links that are each associated with a respective cost, wherein the fifth cost for the first path is calculated further based on the respective cost for each link of the particular set of links.

18. A method, comprising:
receiving information regarding a plurality of nodes and links between the plurality of nodes, wherein the information regarding the plurality of nodes and links includes:
a cost associated with each link of the plurality of links, and
a multi-link constraint that indicates a particular sequence of links between a particular set of nodes of the plurality of nodes, wherein the particular sequence of links includes:
a first link between a first node and a second node, wherein the first link is associated with a first cost, and
a second link between the second node and a third node, wherein the second link is associated with a second cost;
generating a shortcut link between the second node and a fourth node, wherein the shortcut link is based on the second link and a third link between the third node and the fourth node, wherein the third link is associated with a third cost;
calculating a fourth cost for the shortcut link based on the second cost associated with the second link and the third cost associated with the third link;
generating a first path that includes the shortcut link and the first link;
determining that the first path includes the particular sequence of links indicated by the multi-link constraint, wherein determining that the first path includes the particular sequence of links includes determining that the shortcut link, included in the first path, includes the second link;
calculating a fifth cost for the first path based on:
the first cost associated with the first link,
the fourth cost for the shortcut link, and
an additional cost based on determining that the first path includes the particular sequence of links indicated by the multi-link constraint;
receiving, via a network, a request for navigation instructions from a starting point to a destination;

identifying that the first path is a first candidate path from the starting point to the destination;

identifying a second path that is a second candidate path from the starting point to the destination;

identifying a sixth cost associated with the second path;

comparing the fifth cost, associated with the first path, with the sixth cost associated with the second path;

selecting the first path based on comparing the fifth cost to the sixth cost;

generating the requested set of navigation instructions based on the first path; and outputting, via the network, the requested navigation instructions to a fleet management system that manages one or more vehicles to traverse one or more routes based on the navigation instructions.

19. The method of claim 18, wherein the shortcut link is a first shortcut link, wherein the method further comprises:

removing a fifth node from the plurality of nodes;

determining, based on removing the fifth node, whether to generate a second shortcut link to represent a path through the fifth node;

determining that a candidate witness path for the second shortcut link includes at least a portion of the multi-link constraint; and generating, based on determining that the candidate witness path for the second shortcut link includes at least the portion of the multi-link constraint, the second shortcut link to represent the path through the fifth node.

20. The method of claim 18, wherein the particular sequence of links indicated by the multi-link constraint further includes the third link between the third node and the fourth node, and wherein the additional cost is further based on determining that that the first path includes a consecutive traversal of the second link followed by the third link.

* * * * *